(12) United States Patent
Markov et al.

(10) Patent No.: US 10,889,099 B2
(45) Date of Patent: Jan. 12, 2021

(54) SYSTEM AND METHOD FOR AUTOMATIC SUPPORT DEVICE GENERATION

(71) Applicant: Plethora Corporation, San Francisco, CA (US)

(72) Inventors: Ruza Markov, San Francisco, CA (US); William Haldean Brown, San Francisco, CA (US)

(73) Assignee: Plethora Corporation, San Francisco, CA (US)

( * ) Notice: Subject to any disclaimer, the term of this patent is extended or adjusted under 35 U.S.C. 154(b) by 0 days.

(21) Appl. No.: 16/664,055

(22) Filed: Oct. 25, 2019

(65) Prior Publication Data

US 2020/0055301 A1 Feb. 20, 2020

Related U.S. Application Data

(60) Division of application No. 15/608,033, filed on May 30, 2017, now Pat. No. 10,486,415, which is a continuation of application No. 15/263,196, filed on Sep. 12, 2016, now Pat. No. 9,690,274.

(60) Provisional application No. 62/217,614, filed on Sep. 11, 2015.

(51) Int. Cl.
    *B33Y 50/02* (2015.01)
    *G05B 17/02* (2006.01)
    *G05B 19/4097* (2006.01)

(52) U.S. Cl.
    CPC .............. *B33Y 50/02* (2014.12); *G05B 17/02* (2013.01); *G05B 19/4097* (2013.01); *G05B 2219/35025* (2013.01); *G05B 2219/35346* (2013.01)

(58) Field of Classification Search
None
See application file for complete search history.

(56) References Cited

U.S. PATENT DOCUMENTS

| 4,784,493 | A | * | 11/1988 | Turcheck, Jr. ............ B07C 5/02 |
| | | | | 198/395 |
| 5,257,203 | A | | 10/1993 | Riley et al. |
| 5,272,642 | A | | 12/1993 | Suzuki |
| 5,485,390 | A | | 1/1996 | Leclair et al. |
| 5,907,489 | A | | 5/1999 | Elliott |
| 7,110,849 | B2 | | 9/2006 | Landers et al. |
| 9,235,658 | B2 | | 1/2016 | Nelaturi et al. |
| 9,329,591 | B2 | | 5/2016 | Balkenende et al. |
| 9,367,063 | B2 | | 6/2016 | Herrman et al. |
| 9,690,274 | B1 | | 6/2017 | Markov et al. |
| 2015/0127480 | A1 | | 5/2015 | Herrman et al. |
| 2016/0033251 | A1 | | 2/2016 | Pinkston et al. |

OTHER PUBLICATIONS

"Boyle et al. A Review and Analysis of Current Computer-Aided Fixture Design Approaches, Robotics and Domputer-Integrated Manufacturing 27, (2011) 1-12, pp. 1-12. SRC", Aug. 16, 2017 00:00:00.0.

\* cited by examiner

*Primary Examiner* — Ryan A Jarrett
(74) *Attorney, Agent, or Firm* — Jeffrey Schox; Diana Lin

(57) ABSTRACT

The automatic support device generation method includes: receiving a virtual part; determining a retention direction for the virtual part; determining a retention rotation for the virtual part; and constructing a support device based on the part, the retention rotation, and the retention direction.

12 Claims, 10 Drawing Sheets

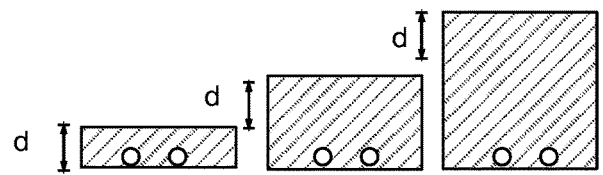
FIGURE 4
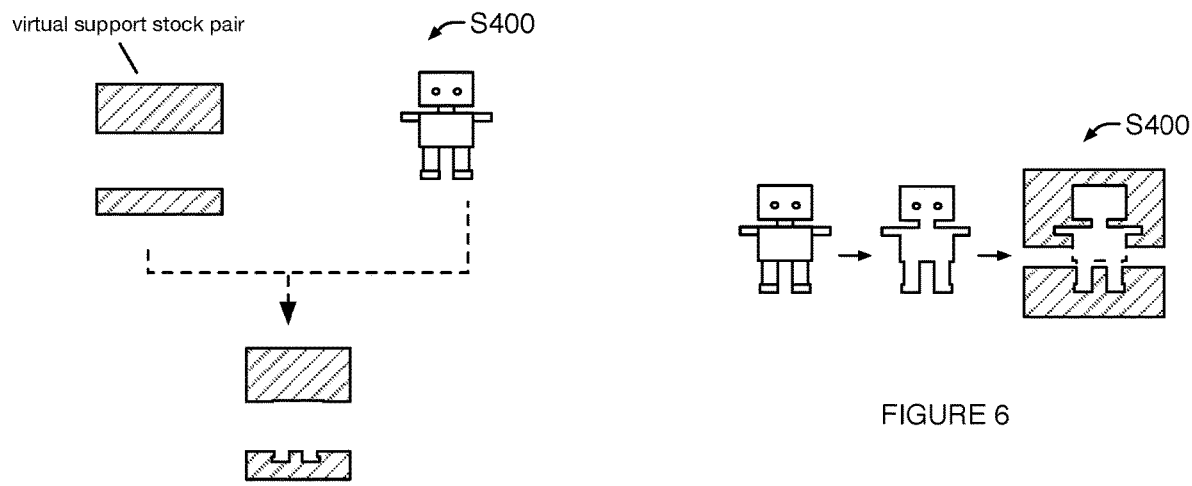
FIGURE 5
FIGURE 6

SYSTEM AND METHOD FOR AUTOMATIC SUPPORT DEVICE GENERATION

CROSS-REFERENCE TO RELATED APPLICATIONS

This application is a divisional of U.S. application Ser. No. 15/608,033, filed 30 May 2017, which is a continuation of U.S. application Ser. No. 15/263,196, filed 12 Sep. 2016, (U.S. Pat. No. 9,690,274 issued 27 Jun. 2017), which claims priority to U.S. Provisional Application No. 62/217,614 filed 11 Sep. 2015, both of which are incorporated in their entirety by this reference.

TECHNICAL FIELD

This invention relates generally to the manufacturing field, and more specifically to a new and useful system and method for automatic support device generation in the manufacturing field.

BRIEF DESCRIPTION OF THE FIGURES

FIG. 4 is a top-down view of an example of virtual support stock options.

FIGS. 5 and 6 are schematic representations of a first and second variation of virtual support device (e.g., virtual fixture) generation, respectively.

DESCRIPTION OF THE PREFERRED EMBODIMENTS

Figure 1:
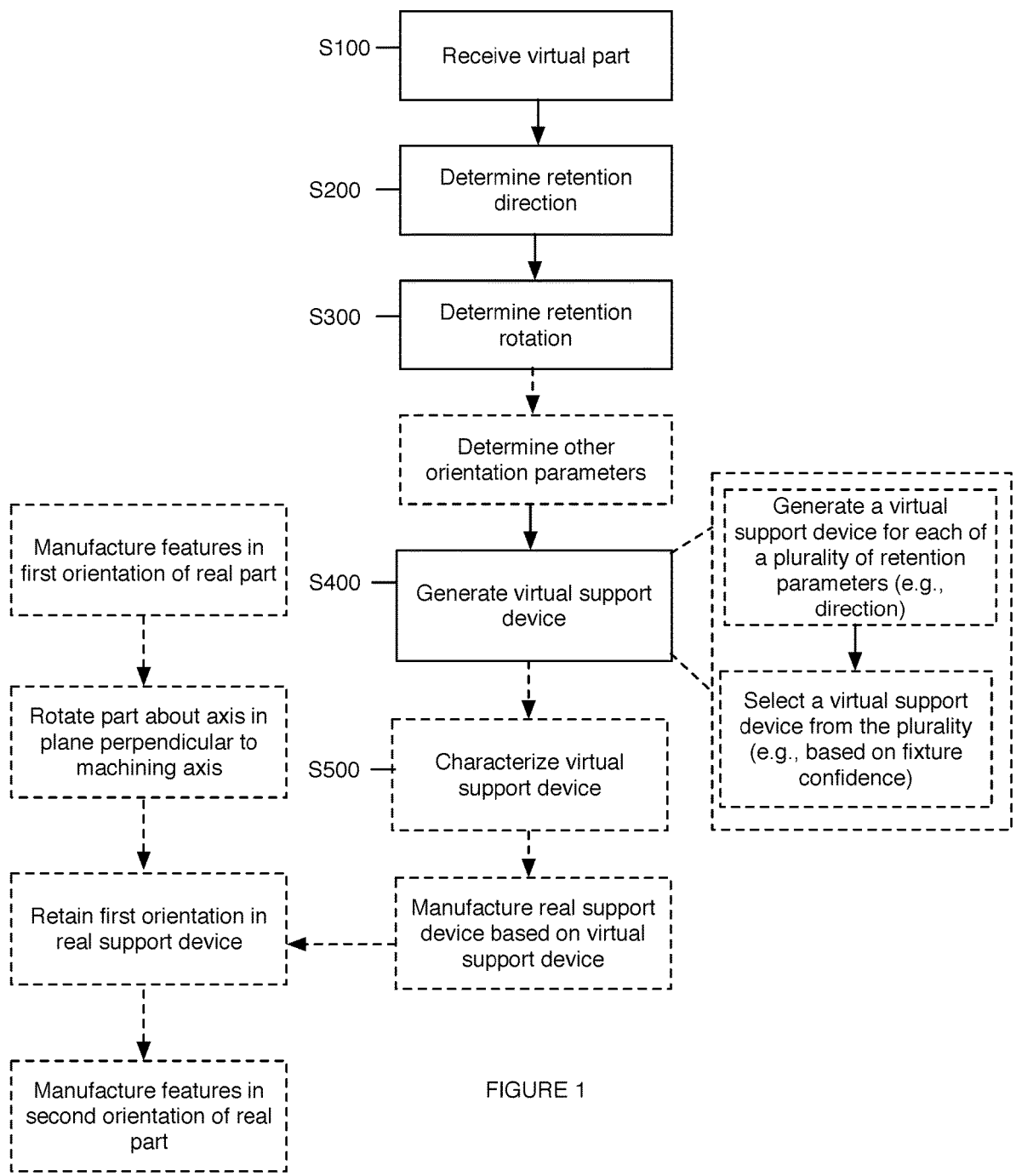
FIG. 1 is a schematic representation of a method of automatic support device generation.

The following description of the preferred embodiments of the invention is not intended to limit the invention to these preferred embodiments, but rather to enable any person skilled in the art to make and use this invention.

1. Overview.

The support device generation method includes: receiving a virtual model of a part (virtual part) S100; determining a retention direction for the virtual part S200; determining a retention rotation for the virtual part S300; and constructing a support device based on the part, the retention rotation, and the retention direction. The method functions to create a custom support device (work-holding device) that locates and supports a physical part during one or more manufacturing processes. The custom support device can be used in 3-axis machines, 5-axis machines, rotary machines, or any other suitable machine. All or part of the method can be performed automatically, manually, or otherwise performed.

In one example of custom support device use (specific example shown in FIG. 13), the majority of a part (e.g., a top orientation, the sides, the interior features, etc.) is manufactured using a generic support device. The partially manufactured part is then rotated (e.g., about an x- or y-axis), and the custom support device coupled to the already-manufactured part features to retain the part along the manufactured part features for subsequent manufacturing processes. In a second example, a part can be mostly formed using additive manufacturing techniques (e.g., casting, printing), wherein the part must be rotated relative to the printing vector or machined after printing. The custom support device can be used to retain the already-printed part features to orient the part in the desired location.

The method is preferably utilized in high mix, low volume manufacturing runs, but can alternatively be used in low-mix, high volume manufacturing runs or in any other suitable application. Conventionally, support devices for high-mix, low-volume manufacturing runs are created using resins, as custom fixture manufacture for each piece can be difficult and costly. In these methods, a partially manufactured part is typically inverted into a resin, which is then cured and used as the fixture. Amongst other issues, the conventional method can suffer from low resolution and insufficient work holding strength. This can result in part over- or under-constraint, tool interference, part defects, and visual defects. In contrast, the method described below can provide a custom, higher resolution fixture, which can decrease or eliminate the drawbacks of the conventional method.

The method can be performed by a computing system of a manufacturing facility, a computing system remote from the manufacturing facility (e.g., a server system), a user device, or be performed by any other suitable computing unit. In a first example, the method is performed by a computing system associated with the manufacturing facility after a finalized virtual model is received by the manufacturing facility. In a second example, the method is performed by a plug-in executing within a CAD program (e.g., on a user device). In a third example, the method is performed by a remote computing system (e.g., set of servers) connected to the user device and/or manufacturing facility.

The method is preferably performed entirely automatically, but all or a portion of the method can be manually performed. For example, a machinist can select the retention direction, generate the master toolpath, or generate the toolpath primitives, while the system can automatically perform the remainder of the method. Automatic support device generation can expedite the manufacturing process, reduce the effects of human error, decrease manufacturing facility uptime for part manufacture, or provide other benefits. For example, automatic support device generation can reduce manufacturing time for a given part by reducing the number of support device iterations (physical support device prototypes no longer need to be made); by reducing the number of flung parts; by reducing the number of quality control errors; or by otherwise reducing the number of manufacturing errors, thereby reducing the manufacturing time wasted on these non-compliant parts. Although some variants of the method can be computationally intensive, the inventors have discovered that the computational cost (e.g., computation time and resources) can be less than the manufacturing cost arising from sub-par support devices (e.g., time lost to manufacturing non-compliant parts).

Furthermore, because the method is automated, the method can generate an optimal support device for the virtual part, the manufacturing facility, the manufacturing machine, the tools, or any other suitable parameter. In one variation, the optimal support device can be the support device that maximizes a score (e.g., workholding confidence score), wherein the score can be determined based on part parameters (e.g., part stiffness), fixture unit parameters (e.g., contact area between the part and the support device, rotational inertia, etc.), machining parameters (e.g., feed rate), cost (e.g., material cost, cost of time, etc.), and/or any other suitable set of parameters.

The method can additionally provide inputs for downstream processes, such as toolpath generation (e.g., automatic toolpath generation) or probe path generation. In a first example, the method identifies the retention direction, which can dictate which features are to be manufactured as a common face (e.g., manufactured from a common manufacturing direction). In a second example, the method identifies the retention rotation, which can dictate where the features should be manufactured relative to the working volume (e.g., align the part coordinates with the work coordinates). In a third example, the method can provide manufacturing parameter values (e.g., feed rate, step-down, etc.) for all or a portion of the physical part, wherein the manufacturing parameter values can be determined based on the fixture unit parameters, part parameters, workholding confidence score, or otherwise determined. These manufacturing parameter values can be incorporated into the resultant toolpath, such that the physical part is manufactured based on the manufacturing parameter values.

The custom support device can be used by a manufacturing facility (e.g., a flexible manufacturing facility), a user, or by any other suitable entity. The method is preferably automatically performed, but can alternatively be performed in response to detection of a trigger event, such as receipt of a user input or selection. The method is preferably performed prior to physical part manufacture, but can alternatively be performed during physical part manufacture (e.g., while the features extending in the retention direction are being manufactured), after partial physical part manufacture, or be performed at any other suitable time.

Figure 2:
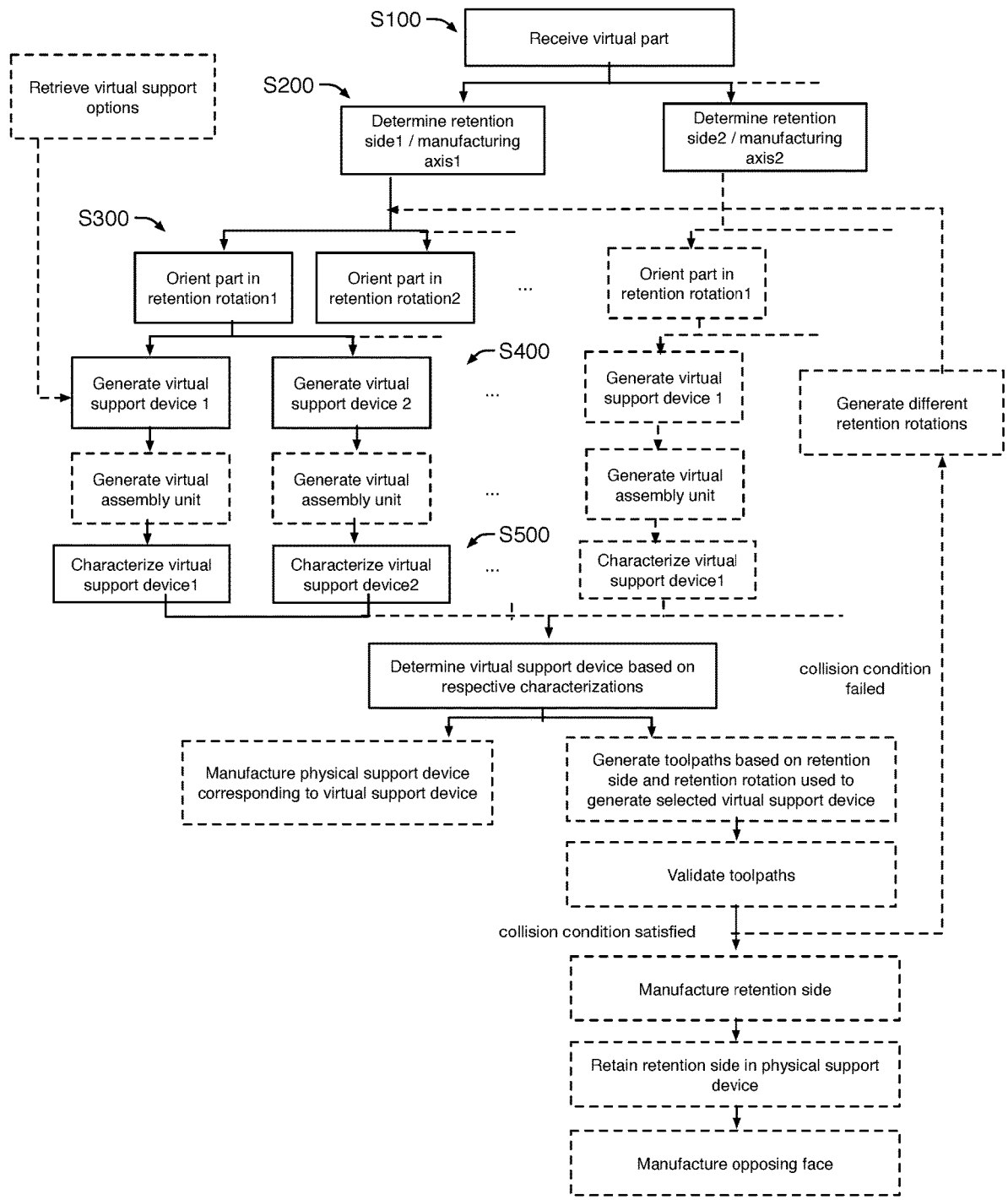
FIG. 2 is a schematic representation of a variation of the method.

In one variation, the method is performed iteratively for a single virtual part, wherein multiple virtual support device geometries are created (e.g., in parallel, in series, etc.) and filtered by applying the method's processes (example shown in FIG. 2). In a second variation, the method is performed once for a single virtual part. However, the method can be performed in any order, for any number of times, for a virtual part. The method can be repeated for one or more virtual parts, wherein each virtual part can be received from the same or from different user accounts. When the method is performed for multiple virtual parts, the method can be run in parallel with method performance for other virtual parts, in series with method performance for other virtual parts, or in any other suitable order.

The method can be run independently or be run as part of an integrated process. In one variation, the integrated process can include: receiving a virtual part from a user account at a user device; generating a virtual support device based on the virtual part; generating a toolpath to machine the virtual part based on the virtual part retention direction and retention rotation associated with the virtual support device; manufacturing a physical support device corresponding to the virtual support device; and manufacturing a physical part corresponding to the virtual part using the toolpath and the physical support device, including: manufacturing the features in the retention side (e.g., manufacturing the features from the manufacturing direction) while retaining the part precursor in a standard support device, inverting the machined retention side into the custom support device, and machining the opposing side while the retention side is retained by the custom support device. The integrated process can additionally include: virtually validating the fixture unit (including the virtual support device and a virtual part precursor); detecting tool collisions with the support device; and regenerating the virtual support device based on the tool collision parameters (e.g., collision location, percentage volume overlap, etc.). The integrated process can additionally include: receiving part quality analyses after part manufacture, identifying part deficiencies (e.g., errors), determining the source of the part deficiencies (e.g., through classification, heuristics, etc.), and updating the support device generation modules in response to determination that the support device was the source of the part deficiency. However, the method can be performed as part of any other suitable integrated system.

The custom support device generated by the method functions to retain a workpiece for part manufacture. The physical custom support device (used during the physical manufacturing process) is preferably manufactured from a virtual custom support device generated by the method, but can be otherwise manufactured. The custom support device can be reused for a different physical instance of the same virtual part, reused for a different virtual part, or otherwise used. The support device (work holding device) can be a fixture (e.g., jaw, milling fixture, drilling fixture, softjaw, hardjaw, etc.), jig, vise, clamp, vacuum tube, magnet set, robot end-effector, weldment jig, assembly fixtures, quality control or assurance fixtures, or be any other suitable support device. The support device can be cooperatively formed from one or more pieces. The support device can include one or more movable components (clamps) that function to engage the part along an engagement surface and to apply a compressive clamping force on the part. The support device can additionally include a solid component (e.g., carrier) configured to affix to the machining plate of a machining volume, or include any other suitable component. In one example, the support device includes a first and second piece (clamps, jaws) configured to engage a first and second opposing side of the part, respectively, along a clamping axis (engagement axis). The clamping force can be applied along the clamping axis, applied at an angle to the clamping axis, or be otherwise related to the clamping axis. The first and second piece can cooperatively enclose the entirety of the part perimeter, enclose a portion of the part perimeter (e.g., engage only opposing features), or enclose any other suitable portion of the part perimeter. The clamps can be flat, include gripping features configured to locate the part within the support device, or have any other suitable feature. The geometry of the gripping features preferably substantially mirror that of the part feature to be located and supported, but can alternatively have any other geometry. The clamps can have a substantially smooth engagement surface, a textured engagement surface, or have any other suitable engagement surface. The first and second piece can be mounted along opposing edges to a first and second carrier, respectively, wherein the carriers can be mounted to fixture plate or other mounting point within a work volume. However, the first and second piece can be otherwise retained within the machining volume. The first and second pieces are preferably mounted to the carriers along a side opposing the respective engagement surface, but can alternatively be mounted to the carriers along a surface adjacent the engagement surface or otherwise mounted to the machining volume.

The custom support device is preferably manufactured from standardized support stock, but can alternatively be manufactured from custom-cut support stock or manufactured from stock having any other suitable set of dimensions. The custom support device can be manufactured in a similar manner to manufacturing the part (e.g., automatically: selecting base stock, identifying the part features, generating a toolpath to manufacture the features, and machining the features using the toolpath into the base stock), but can be otherwise manufactured (e.g., stamped, printed, etc.). The custom support device can be manufactured in the same run (e.g., concurrently manufactured in the same machining volume, on the same fixture plate, using the same master toolpath, etc.) as other physical custom parts, be manufactured in a separate run, or manufactured with any other suitable component.

The support stock can be prismatic (e.g., rectangular, octagonal, etc.), cylindrical, spherical, or have any other suitable shape. The support stock can include mounting features configured to mount the support stock to the carrier along a carrier end of the support stock (e.g., opposing the engagement end). Alternatively, the mounting features can be manufactured into the support stock before, during, or after engagement feature manufacture.

The standard support stock (standard fixture stock) used for custom support device manufacture is preferably a standard option from a set of standard support stock options. The standard option set can include one or more options for standardized support stock (standard option), each standard option having different dimensions (e.g., height in the z-direction or retention direction, depth along the clamping axis, width perpendicular to the clamping axis, radius, etc.) from the remainder of the set. Each dimension can vary by a preset unit, or vary in any other suitable manner. In one example, shown in FIG. 4, each standard option within the set has the same thickness and width, but differing depths. The depths can vary between the options by a predefined depth unit (e.g., each successive standard support stock option has a depth that is 1 depth unit longer than the previous option) or otherwise vary between the options. However, the dimensions of the standard support stock options can otherwise vary within the set.

All or a portion of the custom support device can be manufactured from the support stock. In one variation, the entire custom support device is made from a single piece of standard stock (e.g., made using a single option from the standard stock set). In a second variation, a single piece of the custom support device (e.g., the first piece, the second piece, etc.) is made from a single piece of standard stock (e.g., made using a single option from the standard stock set), such that the custom support device is made from multiple pieces of standard stock. For example, the first piece can be made from a first standard support stock piece and the second piece can be made from a second standard support stock piece, wherein the first and second standard support stock pieces are selected from the standard support stock set and can be the same or different standard support stock option. In variants of the method that generate negatives for part voids, the negatives can be manufactured from standard stock, custom stock, or any other suitable stock.

The physical support stock can be virtually represented by corresponding virtual support stock (e.g., virtual fixture stock). For example, each physical standard option for support stock can be represented by a corresponding virtual standard option for the support stock. Alternatively, the physical standard support stock option can be virtually unrepresented. For example, a physical standard support stock option for physical custom support device manufacture can be selected based on the virtual custom support device dimensions (e.g., wherein the standard physical stock size exceeds, substantially matches, or is otherwise related to the virtual custom support device dimensions). However, the physical support stock can be otherwise related to virtual representations of the support stock. The virtual support stock options (or derivatory data structures) can be stored in a remote computing system (e.g., a database), wherein the virtual support stock options can be retrieved by the local computing system from the remote computing system before use. Alternatively, the virtual support stock options (or derivatory data structures) can be stored locally on the local processing system, or otherwise stored. The virtual support stock options can be supplied by the manufacturing facility (e.g., wherein different manufacturing facilities can have different support stock types, and therefore different virtual support stock options), supplied by a third entity (e.g., a stock supplier), or by any other suitable source.

In one variation, the system includes a set of virtual standard support options, wherein the first and second virtual pieces of the virtual custom support device are based on a first and second virtual standard support option from the set. In a second variation, the system includes a set of virtual support pairs, wherein the set of pairs includes every permutation of virtual standard support option combinations for the first and second pieces of the custom support device. This can be desirable when the method only considers half of the part rotations, and can function to reduce the processing load on the computing system. However, this variation can be otherwise used. In one example, the first and second custom support device pieces both share the same set of virtual standard support options (e.g., each can be selected from the same set of virtual standard support options), and the plurality of virtual support stock pairs encompass every combination of the virtual standard support options for the first and second piece. In a third variation, the set of pairs includes a filtered set of pairs. In one embodiment of the third variation, the filtered set can include only the unique option combinations from the second variation. This embodiment can be desirable when the method considers all potential part rotations, and can function to reduce the amount of storage required (e.g., if the method is being run on a user computing system, such as a laptop or user computer). However, this embodiment can be otherwise used. In a second embodiment of the third variation, the filtered set can include only pairs satisfying a stock dimension requirement (e.g., having a dimension above or below a threshold dimension), wherein the requirement can be determined based on the part (e.g., part features) or otherwise determined. For example, the filtered set can include only pairs with a stock depth for the first piece that exceeds a threshold depth, wherein the threshold depth is required to fully support all features extending along a side of the virtual part. In a third embodiment, the filtered set can include only pairs previously used for similar parts (e.g., wherein the similarity can be based on part feature classifications, dimension, distribution, or other parameters; material; tolerances; etc., or otherwise determined). However, the set can be otherwise filtered.

The part is preferably a custom part that substantially mirrors the virtual part model, but can alternatively be a generic part or be any other suitable part. The part is preferably manufactured from part stock using subtractive manufacturing (e.g., milling, turning, drilling, boring, etc.), but can alternatively be formed using additive manufacturing (e.g., 3D printing, stereolithography, casting, etc.) or a combination of the above. The support device can be made and used for any of these processes. The part stock can be standardized (e.g., have a set of predetermined dimensions), custom-cut, or otherwise dimensioned. In one variation, the part stock can be substantially rectangular prismatic, and have a first and second opposing orientation corresponding to a first and second opposing broad face. The part can additionally include sides (e.g., side walls) that extend between and connect the first and second opposing broad faces. However, the part can have any suitable profile.

The part can include a set of features (part features). The features can be exterior features, interior features, or arranged on any other suitable part surface. The features can be classified, assigned to a part face, used to determine the part face, or otherwise processed. The features can optionally be associated with a tolerance or a tolerance range, which can be automatically determined, received from the user account (from which the part was received), determined from the part, received from a third party account, or otherwise determined. The part can additionally include internal voids (e.g., holes), wherein the volume, placement, proportion of the part, and/or other parameter of the internal voids can be subsequently used to generate the custom support device.

The part preferably includes at least a first and second opposing orientation (corresponding to a first and second operation, respectively) and a set of sides adjacent to and extending from the first orientation to the second orientation. The part orientation is preferably the part surface that is exposed when the part is retained during manufacturing, but can alternatively or additionally be a part face, include all features having parallel normal vectors, or be a part portion defined in any other suitable manner. In the variation in which the part is manufactured from a piece of part stock, the first part orientation is preferably manufactured from the first orientation (e.g., first broad face) of the part stock, and the second orientation is preferably manufactured from the second orientation of the part stock. The part sides can additionally be manufactured from the first or second orientation of the part stock. In a specific example, the part sides, first part orientation, and any interior part features are manufactured from the first stock orientation (e.g., wherein the first stock orientation is exposed to the manufacturing tool), wherein the second stock orientation is retained as a sacrificial piece that is discarded after the part is made.

2. Receiving Virtual Parts.

Receiving a virtual part S100 functions to receive a virtual representation of a physical part (real part) to be manufactured and retained. The features of the virtual part are subsequently used to select the retention direction, the retention rotation, the retention depth, and the support device features. The virtual part can include a set of vectors, a set of polygons (e.g., a mesh), or be defined in any suitable manner.

The virtual part is preferably received by the computing system generating the support device, but can alternatively be received by any other suitable computing system. The virtual part is preferably received from a user device, more preferably a computer aided drafting engine (e.g., CAD software) implemented on a user device, but can alternatively be received from any other suitable source. The user device can be remote from the computing system, collocated with the computing system, or otherwise arranged relative to the computing system. The virtual part is preferably associated with a user account, wherein the user account is associated with the user device (e.g., logged into the user device, associated with the CAD software, etc.), but can alternatively be associated with an address, a user identifier, or any other suitable data. The virtual part can be received in real-time, as the part is being generated by a user on the computer-aided drafting engine (e.g., as the user inserts features into the virtual part); received after the virtual part has been finalized (e.g., after the virtual part model has been sent to the manufacturing facility); or be received at any other suitable time. The virtual part can be sent over a wired connection, over a wireless connection, or be transferred in any other suitable manner. The virtual part can be associated with a toolpath, wherein the toolpath can be automatically generated based on the features of the virtual part, manually generated (e.g., received from the user account or another entity), or otherwise determined. In some variants, the method can additionally include manufacturing the virtual part using physical part stock (e.g., standard, custom) based on the toolpath associated with the virtual part. When multiple parts are manufactured in the same run (e.g., concurrently in the same volume), the toolpath used can be generated from the constituent toolpaths of each part to be manufactured in the volume.

The method is preferably performed for each virtual part, and can be performed for multiple virtual parts in parallel, in series, in batches, as the parts are received, or at any other suitable time. In one variation, the method can include: selecting multiple virtual parts, performing the method on the selected virtual parts, machining the fixtures for each of the selected virtual parts, and machining the selected virtual parts using the fixtures. The selected virtual parts can be selected using an optimization analysis (e.g., to minimize or maximize one or more variables, such as manufacturing cost, manufacturing time, tools required, machines required, material cost, workholding confidence score, failure risk, empty space on a fixturing plate or work volume, etc.), selected based on shared parameters (e.g., shared tools, shared processes, etc.), or otherwise selected. The selected virtual parts can include: custom virtual parts, each received from the same or different entity (e.g., different user account); fixtures generated by the method, or any other suitable part.

3. Determining Part Orientation.

Determining a retention direction for the part S200 functions to identify the orientation of the part retained within the support device (retained part orientation). More specifically, determining the retention direction identifies the virtual part orientation (corresponding to the real part orientation) that will be arranged in the virtual support device (corresponding to the real support device). Additionally or alternatively, S200 can include determining a retention side. The retention side can be the part side enclosed within the support device and/or base plate, the part side opposing the side being machined while the part is retained within the support device, the external part side from which the retention direction extends, the part side with a normal vector substantially anti-parallel the retention direction, the part side accessible from the retention direction (e.g., with a normal vector parallel the retention direction, with a locus of directions perpendicular the machining axis), or be otherwise defined. In operation, the identified part orientation will be enclosed by the support device and/or a baseplate, such that the orientation opposing the retained part orientation (exposed part face) is exposed to the manufacturing tool. The support device (preferably the clamps but alternatively any other component) preferably engage the part features adjacent and/or extending from the identified part orientation to retain the part, but can alternatively engage any other suitable portion of the part. The features in the identified part orientation will preferably be manufactured prior to part clamping within the support device, but can alternatively be manufactured during or after part clamping within the support device.

The retention direction can include: major part axes (e.g., x, y, z; coordinate system axes aligned with the minimum bounding box; etc.), normal vectors to major part faces (e.g., largest substantially contiguous part faces, faces uninterrupted by a corner, etc.), corner vectors extending from the part center (e.g., an intersection of the major part planes) to the part corners, or be any other suitable part vector. The retention direction is preferably the direction in which the normal to the first part orientation (and/or first stock orientation) will be facing, relative to the solid component of the support device, a gravity vector, a tool, or relative to any other suitable external component, but can be any other suitable direction. In a first example, the retention direction can be the part orientation that exposes the part surface for an operation on the part surface. In a second example, when a part having a first and second opposing orientation is to be manufactured from a rectangular prismatic block of part stock lying on a horizontal surface (e.g., arranged with a broad face perpendicular to a gravity vector), the retention direction can be one of two directions: up, wherein the first orientation of the part is arranged distal the solid component (and is therefore processed after the features of the second orientation are manufactured), or down, wherein the first orientation of the part is arranged proximal the solid component (and is therefore processed before the features of the second orientation are manufactured). In a third example, the part in the second example can have 10 retention directions: up, down, and every corner (e.g., wherein the part can be retained along the faces forming the respective corner during manufacture). However, the retention direction can be otherwise determined.

The retention side is preferably the part side exposed in the first part orientation, and is preferably the part face that is machined first. However, the retention side can be any other suitable face. The retention direction preferably extends normal to the exterior of the retention side, away from the remainder of the part. However, the retention direction can be otherwise related to the retention side. The retention side can include: virtual part sides parallel to major planes of the part, wherein the sides and/or major planes can be automatically identified, determined from the virtual part file, or otherwise determined; virtual part surfaces satisfying a predetermined set of variable values, the variable values determined based on the manufacturing process requirements or otherwise determined; surfaces specified by a user; surfaces from which a predetermined set of features extend; and/or include any other suitable set of virtual part faces. Each retention side can include a set of features extending from the potential retention side. In one variation, the method can include automatically classifying each feature and grouping the features into a set of faces (e.g., based on the feature bases), wherein the retention side is one of the set of faces. However, the retention sides can be otherwise identified.

In a first variation, the method includes identifying a plurality of potential retention sides or directions on the virtual part, wherein the all or a portion of remaining method is performed for each potential retention side of the plurality. In one example of potential retention side plurality use, for each potential retention side of the plurality of potential retention sides, generating a plurality of potential retention rotations in a plane parallel the potential retention side. However, any suitable portion of the method can be performed using the plurality of potential retention sides. In one example, the plurality of potential retention sides can include the part faces parallel each major part plane (e.g., extending along the x-y plane, the y-z plane, and the x-z plane). In a second example, the plurality of potential retention sides can include the part faces parallel each major part plane and the faces forming the part corners (e.g., wherein the retention directions include both normal vectors to the major planes and vectors extending from the part center to the part corners). However, the plurality of potential retention sides can include any other suitable set of faces.

In a second variation, the retention side or direction can be selected through an optimization equation, but can alternatively be iteratively selected, manually selected, or otherwise determined. The retention direction is preferably determined based on the virtual part model, but can alternatively be determined based on any other suitable virtual part. The retention direction is preferably determined based on the amount of external virtual part surface area available to the support device when the part is arranged in the given orientation, but can alternatively or additionally be determined based on the order of manufacturing steps (e.g., the number of operations per part orientation, the access angles per part orientation, etc.), the geometry and location of internal features, or be based on any other suitable variable. The retention direction is preferably optimized to maximize the part's surface area in contact with the support device (contact surface, contact area), but can alternatively or additionally be optimized to minimize machine time, assembly time, cost, amount of stock material used, or any other suitable parameter. For example, a first direction, wherein the second part orientation is enclosed within the support device, can be selected when the first part orientation (opposing the second part orientation) includes a small protrusion (e.g., boss) in the center of the first part orientation, and the second part orientation includes a rim of substantially constant height extending about its perimeter. However, the retention side or direction can be otherwise determined.

Determining a retention rotation S300 functions to identify the portions of the part sides and/or features (extending along the retention direction and/or defined in the identified part orientation) that should be retained by the support device. Determining the retention rotation can additionally or alternatively function to determine the rotation of the part within the support device. The virtual part can be rotated: within a plane substantially parallel to the retention side (e.g., within a threshold range of parallel), about a normal vector to the retention side, about the retention direction, about a z-axis (e.g., a milling direction), the accessible direction of the machine in the last operation while the part is fixture using the generated support device, within a plane at an angle to the retention side, major plane of the virtual part, broad face of the virtual part, the face opposing the retention side (e.g., at a non-zero angle, at a perpendicular angle, etc.), or in any other suitable plane. The considered part rotations can include: rotations generated based on the part geometry, a predetermined set of rotations (e.g., wherein each rotation within the set is separated by a predetermined interval), or be any other suitable part rotation.

In a first variation, determining the retention rotation includes determining a plurality of potential retention rotations, wherein each potential retention rotation can differ from another potential retention rotation of the plurality by a predetermined angular rotation. The retention rotations can be retrieved, calculated, or otherwise determined. In a first embodiment, the plurality of potential retention rotations include every rotation interval within a given range of rotations (e.g., wherein each successive potential retention rotation is separated from the prior rotation by a predetermined rotation interval). For example, the plurality of potential retention rotations can include every virtual part rotation, about a normal vector to the retention side and/or within a plane substantially parallel to the retention side, between 0° and 360° at predetermined rotation degree intervals (e.g., at 7° intervals, at 15° intervals, at 25° intervals, etc.). In a variation of the method, the rotation intervals initially used can be relatively coarse (e.g., 15° intervals), wherein finer and finer rotation intervals can be subsequently used if the results are insufficient (e.g., all rotation results have a work holding confidence score below a threshold score). In a second example, the plurality of potential retention rotations can include every virtual part rotation between 0° and 180°, at predetermined rotation degree intervals (e.g., at 7° intervals, at 15° intervals, at 25° intervals, etc.). However, any suitable range of rotations at any suitable interval can be used. In a second embodiment, the rotation intervals can be randomly selected. In a variation of the method, the retention rotation can be iteratively refined by selecting the rotation range bounded by rotations with the best scores (e.g., highest scores) and randomly generating rotations within the identified range. However, the rotation intervals can be otherwise determined.

In a second variation, the retention rotation is determined to maximize the surface area of the part in contact with the support device (e.g., maximize the friction force cooperatively generated between the part and support device), but can alternatively or additionally be selected to minimize component warping (e.g., wherein thicker part features are preferred over thinner part features, opposing side pairs connected by material are preferred over those separated by a void, etc.), selected to minimize slipping, or selected based on any other suitable variable. The retention rotation can be selected using an optimization function, selected heuristically (e.g., avoid parallel sides, prefer corners, etc.), selected based on kinetic analyses (e.g., using FEA to determine part strain and/or warping), iteratively determined, or determined in any other suitable manner. The retention rotation is preferably optimized to maximize the part's contact area, but can alternatively or additionally be optimized to minimize machine time, assembly time, cost, or any other suitable parameter.

The method can additionally include determining a seating position, which functions to determine the part location within the retention plane. The seating position can be defined by a seating depth (e.g., along the retention axis), lateral seating position (e.g., perpendicular the retention axis), or by any other suitable position along any other suitable axis. In one variation, determining the seating position can include analyzing the virtual support device and/or assembled unit resulting from positioning the virtual part at each available seating position, wherein adjacent available seating positions are separated by a predetermined distance. In a second variation, determining the seating position can include iterating through different proportions of the part surfaces engaged or encompassed by the support device. For example, the support device can extend along an entire side, or run along 20% of the side's length. The part surface's contact area can be determined based on a predetermined minimum contact area, by maximizing the contact area, by considering machining tool paths and/or processes for the exposed orientation, by considering whether or not the part would clear the support device, or be determined in any other suitable manner. Each side is preferably symmetrically retained (e.g., the proportion of contact area for each side about a corner or other feature is preferably substantially similar), but can alternatively be asymmetric. The contact area or proportion of the first side can be the same as or different from the contact area or proportion of the second side of the pair. However, the seating position can be otherwise determined.

The method can optionally include determining a support device height for the part, which functions to determine how deep the part can be inserted into the support device (e.g., how much of the part can be retained along the manufacturing axis by the support device), or, conversely, how tall the support device should be (e.g., the height of the clamps from the solid component). Alternatively, the support device height can be predetermined or fixed, such as when standard support stock is used. The support device height is preferably determined before the virtual support device model is generated, but can alternatively be determined during or after. The support device height is preferably determined based on tool access to the exposed part orientation for associated manufacturing processes (to be performed on the exposed part orientation), but can alternatively be determined based on the height of the part feature, or be determined in any other suitable manner. In one example, when the manufacturing process for the exposed orientation includes an edge process (e.g., filleting the edge of the exposed part orientation), the support device height can be reduced to avoid tool interference or binding with the support device during the edge process. In this example, the support device height can be determined based on the tool dimensions (e.g., tool diameter), based on any proximal features extending from the exposed part orientation located within a threshold distance of the edge to be processed (e.g., within a tool diameter's distance of the edge), be determined based on the proximal feature geometry (e.g., height, profile, etc.), or be determined based on any other suitable variable.

4. Constructing a Virtual Support Device.

Constructing a virtual support device S400 functions to create a virtual model of the support device (virtual support device), which can subsequently be used to manufacture a real support device to support the real part. The virtual support device is preferably constructed based on the features of the virtual part extending along the retention direction and proximal the virtual clamps (e.g., based on the geometry of the contact surface). The virtual retention features of the virtual support device preferably complement the external profile of the virtual part contact area, but can alternatively or additionally complement the internal virtual part profile (e.g., complement virtual features extending parallel the retained orientation), complement the sides of the exposed part orientation, or complement any other suitable portion of the virtual part. The virtual retention features of the virtual support device can additionally be offset from the retained part by a threshold tolerance, wherein the tolerance can be predetermined, received from the user account, or otherwise determined.

Figure 7:
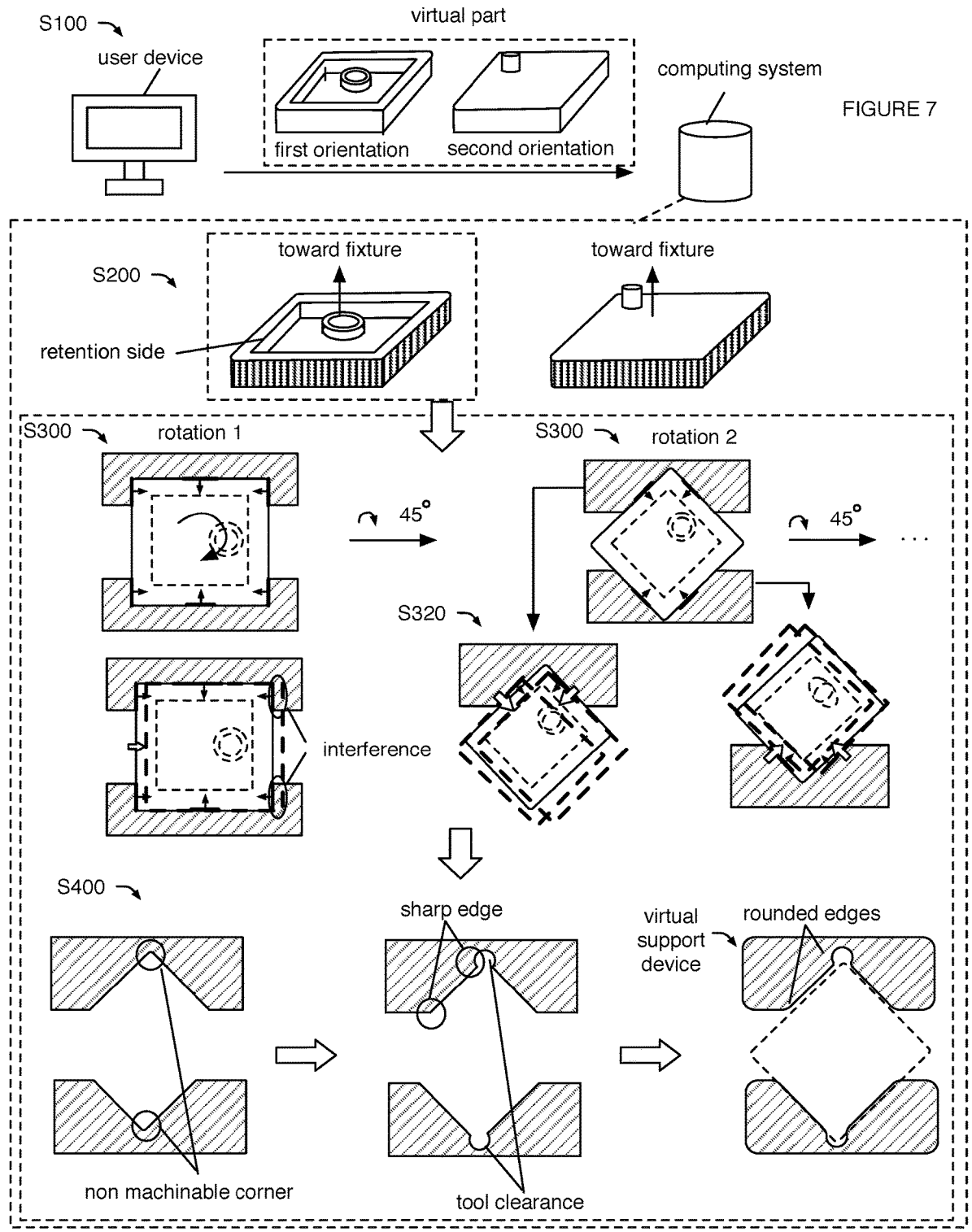
FIG. 7 is a schematic representation of virtual custom support device generation for a custom part.
Figure 8:
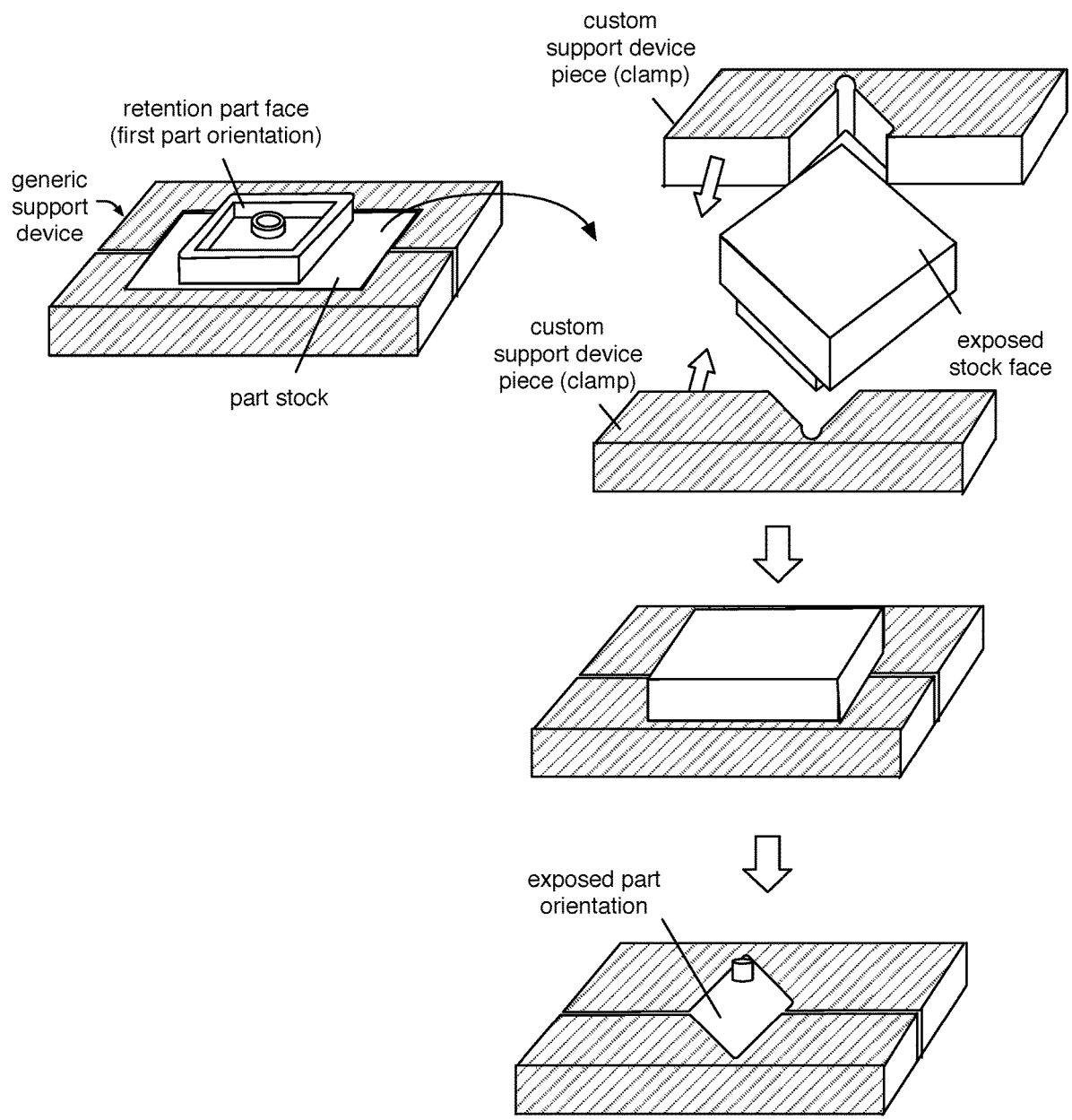
FIG. 8 is a schematic representation of part manufacture using a real version of the custom support device of FIG. 2.
Figure 12:
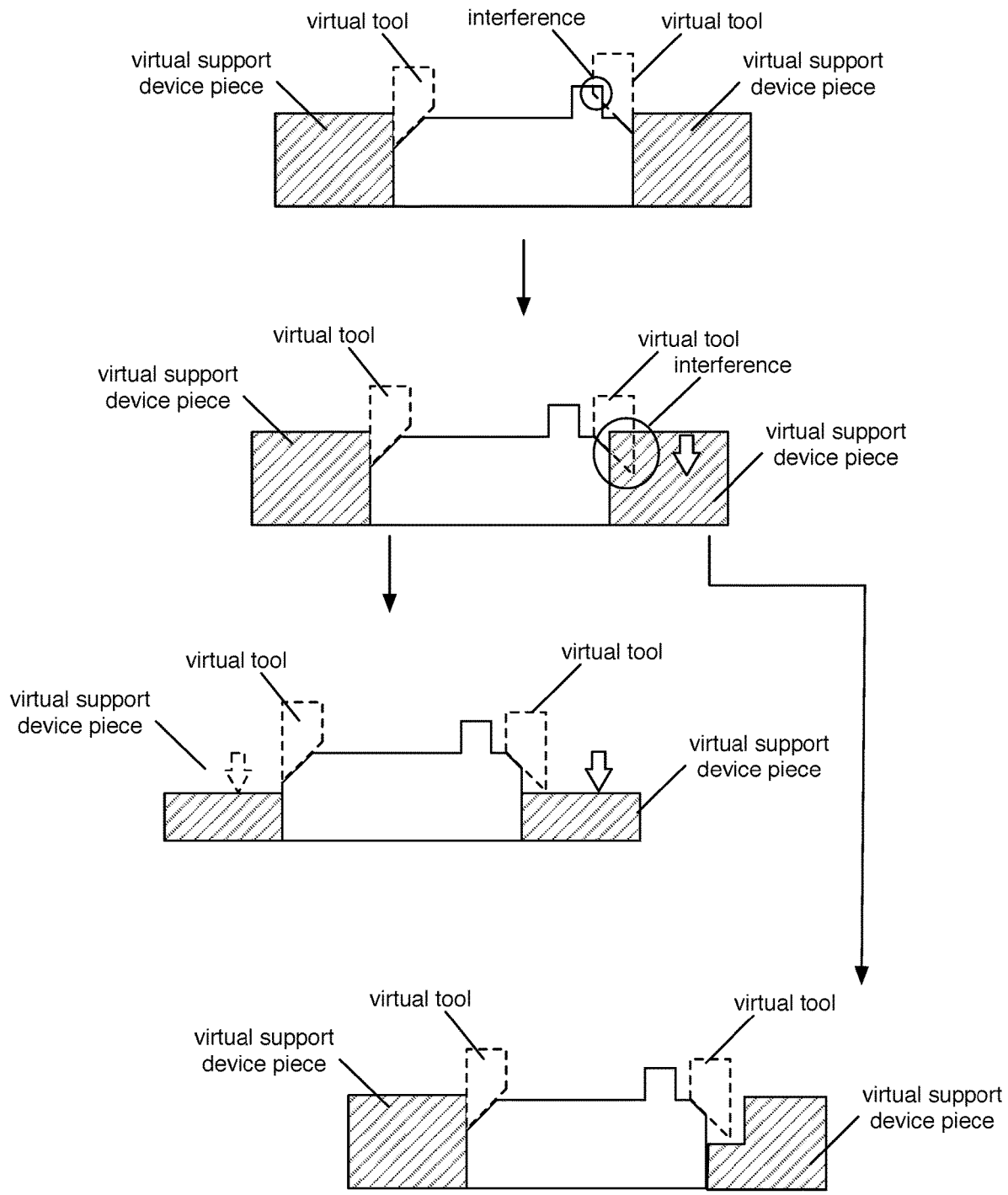
FIG. 12 is a schematic representation of an example of determining the retention depth.

Constructing the virtual support device can additionally include: clearing otherwise non-machinable features (e.g., including a tool aperture to enable a tool to access an otherwise corner enclosed by the support device, example shown in FIG. 12), including features to relieve part stress, rounding (e.g., filleting) virtual support device edges in virtual contact with or proximal the virtual part (e.g., to minimize visual defects), or otherwise post-processing the virtual support device geometry (example shown in FIG. 7). Non-machinable features cam include corners with radii below a threshold radius, corners having an internal angle less than a threshold angle, features with dimensions too small for manufacture or stability (e.g., based on the anticipated manufacturing forces, material strength, etc.), or any other suitable feature. Non-machinable features can be determined: heuristically, deterministically, probabilistically (e.g., based on historic adjustments and the respective support device's performance), calculated, iteratively determined (e.g., by running one or more simulations; by generating a potential virtual support device with each adjustment and comparing the resultant virtual support devices, etc.), or otherwise determined. The method can optionally include removing the virtual support device from consideration, repeating all or part of the method to generate a different virtual support device, or performing any other suitable process in response to determination that the non-machinable features cannot be removed from the support device or other changes cannot be made while maintaining satisfactory support device performance.

In a first variation, generating a potential virtual support device includes virtually subtracting the virtual part from the potential virtual support option (example shown in FIG. 5). This can include subtracting all or some of the volume of the virtual part from a virtual model of the potential support stock option. In one example, virtually subtracting the virtual part from each potential virtual support option can include subtracting the set of features extending from the retention side from the potential support stock option, wherein the set of features are rotated according to the respective potential rotation relative to the virtual stock support device pair. For some parts, this can result in an overhang (e.g., when the part feature is thinner than the virtual support stock thickness), which can be removed or retained. The retention direction is preferably directed toward the bottom of the virtual support device (e.g., the retention side arranged proximal the support device bottom), but the virtual part can be otherwise arranged relative to the virtual support device. The virtual part insertion depth into the potential support stock option can be: limited by the tallest feature extending from the retention direction (e.g., such that the distal surface of the feature is substantially flush with the bottom of the potential support stock option), offset from the bottom of the potential support stock option by a predetermined distance, determined based on the fragility of the features (e.g., based on a feature stress analysis, etc.), or otherwise determined. The virtual part is preferably offset from the carrier portion of the potential virtual support option by a threshold distance (e.g., predetermined, received from the user, determined based on the support stock material, etc.), but can alternatively be centered within the potential virtual support option, tested at different distances away from the carrier side of the potential virtual support option, or otherwise arranged relative to the potential virtual support option.

In a second variation, constructing a potential virtual support device includes determining the curvature of the retention side (e.g., of the features extending from the retention side), and building the virtual support device from the curvature of the retention side (e.g., using all or part of the curvature as a negative for the virtual retention features of the virtual support device) (example shown in FIG. 6). The curvature of the retention side can be determined by meshing the surface, generating vectors representing the surface, or otherwise determined. The mesh, vectors, or other virtual surface representation can be: generated using a geometry determination module, received as part of the virtual part (e.g., from the CAD program), or otherwise determined. In a specific example, constructing the virtual support device can include: splitting a virtual representation of a piece of fixture stock into a predetermined number of components along an axis perpendicular to an anticipated clamping force vector; determining the geometry for each contact surface of the virtual part; assigning each virtual piece of fixture stock to a different contact surface; and removing a virtual volume having the contact surface geometry from the respective virtual fixture stock piece. However, the virtual support device can be otherwise generated.

One or more virtual support devices for the part can be constructed in parallel or in series. Multiple virtual support devices for a given virtual part are preferably determined in parallel, wherein each virtual support device is determined for a different combination of the different retention directions, retention rotations, other part orientations, virtual support options, and/or other parameters (examples shown in FIG. 2 and FIG. 13). Alternatively, a single virtual support device can be determined, using the optimal part orientations (e.g., determined heuristically, based on the part features). Alternatively, different virtual support devices, generated using different combinations of part orientation parameters and virtual support options, can be generated and tested until a virtual support device satisfying the clearance requirements is generated. However, any other suitable virtual support device can be constructed.

In one variation, constructing the virtual support device S400 includes: retrieving a set of virtual support stock options (e.g., virtual stock fixture options) and generating a set of potential virtual support devices based on the set of virtual support stock options and the virtual part. The set of virtual support stock options can be retrieved from: local storage (e.g., user device storage), a remote computing system, the manufacturing facility database, or other storage. The set of virtual support stock options can include: a set of virtual support stock option pairs, each virtual support stock option pair including a first standard virtual support stock option opposing a second standard virtual support stock option, wherein the set of virtual support stock option pairs encompass every combination of standard virtual support stock options for the first and second support device piece; a set of virtual support stock options for the first support device piece and a set of virtual support stock options for the second support device piece; or any other suitable virtual support option. The set of virtual support stock options can be unfiltered (e.g., wherein all virtual support stock options are considered), filtered based on parameters of the virtual part (e.g., filtered for virtual support stock options larger than the part major dimension), or otherwise filtered.

In a first embodiment, the set of virtual support devices is generated for each combination between a virtual support stock option and each virtual part retention direction. For example, a first and second potential virtual support device can be generated for a given potential virtual support option and a first and second retention direction of the part, respectively. In a second embodiment, the set of virtual support devices is generated for each combination between a virtual support stock option and each virtual part retention rotation. For example, a plurality of potential virtual support devices can be generated for a given potential virtual support option and a set of retention rotations of the part, respectively. In a third embodiment, the set of virtual support devices is generated for each combination between: a virtual support stock option (e.g., each virtual support stock option of a retrieved set), each virtual part retention rotation, and each virtual part retention side. However, the virtual support devices can be generated for any suitable combination of the virtual support stock option(s) and virtual part orientation relative to the virtual support stock.

In one example, the set of virtual support stock options include a set of virtual support stock pairs, each virtual support stock pair including a first virtual support stock opposing a second virtual support stock, wherein the plurality of virtual support stock pairs encompass every combination of virtual support stock options for the first and second pieces of the support device. Generating the set of potential virtual support devices includes generating a potential virtual support device for each combination of: each potential retention side, each potential retention rotation, and each virtual support stock pair. In a specific example, generating the set of potential virtual support devices includes generating a potential virtual support device for each combination of: each potential retention side, each potential retention rotation between 0° and 180°, and each virtual support stock pair of the set, wherein the set encompasses every combination of the virtual support stock options for the first and second piece (e.g., wherein the set of virtual support stock pairs includes isomers). In a second specific example, generating the set of potential virtual support devices includes generating a potential virtual support device for each combination of: each potential retention side, each potential retention rotation between 0° and 360°, and each virtual support stock pair of the set, wherein the set encompasses half the combination of the virtual support stock options for the first and second piece (e.g., wherein the set of virtual support stock pairs are unique and do not include isomers). However, the set of virtual support devices can be otherwise generated based on a set of virtual support stock options.

In a second variation, constructing the virtual support device S400 includes: selecting a virtual support stock option from a set of available virtual support stock options based on the dimensions of the virtual part, the selected retention side (retention direction), retention rotation, and/or other selected part orientation, and generating the virtual support device based on the selected option and the virtual part (e.g., features extending from the retention side, etc.). This variation can be useful in variants in which a retention direction, rotation, or other part arrangement parameter has been pre-determined (e.g., determined as the optimal parameter value, received from a user, etc.), but can be used with other variants. However, the virtual support device can be otherwise constructed.

Constructing the virtual support device S400 can optionally include generating plugs for internal part voids. The plugs can be used to support the part from the part interior (e.g., to prevent part deformation) during part manufacture. Plugs can be generated and/or used when: a flex metric exceeds a threshold value, the part stiffness falls below a threshold stiffness, the work holding confidence score falls below a threshold value, the void volume is larger than a threshold proportion of the part volume (e.g., more than 25%, 60%, etc.), the void dimensions are more than a threshold proportion of the surrounding material thickness, or when any other suitable condition is met. The part stiffness can be estimated (e.g., based on the ratio of void volume to solid volume, based on the ratio of void dimensions to solid material thickness along a given axis, etc.), calculated (e.g., using FEA or other stress analysis methods), or otherwise determined.

Internal voids can include through holes, pockets, cutouts, or any other suitable internal void. Internal voids can be voids having an opening along the retention side, voids having an opening along the opposing side, voids having an opening along a part face substantially parallel the clamping vector (e.g., within a predetermined angular range of parallel, such as between −45° to 45° from parallel), voids having a depth larger than a threshold depth (e.g., deeper than 5% of the material thickness), or be otherwise defined.

The plugs can be smaller than the respective internal void (e.g., be separated from the internal void wall by a threshold tolerance distance), or be otherwise sized. The plugs can be generated concurrently with virtual support device generation, before virtual support device generation, after virtual support device generation, or at any other suitable time. The virtual plugs can be generated using the same computing module as the virtual support device generator, or be generated using a different computing module. The physical plugs (e.g., physical analogs of the virtual plugs) can be manufactured using the same methods as support device and/or part manufacture, printed (e.g., 3D printed), or otherwise manufactured.

In a first variation, generating the plugs can include identifying the internal voids within the part and generating positive volumes from the identified internal voids as the plugs. The internal voids can optionally be shrunk (e.g., by a predetermined tolerance) before or after positive volume generation.

In a second variation, generating the plugs can include subtracting the virtual part from a virtual model of plug stock. The virtual plug stock can be one of the virtual support stock options (e.g., wherein the plug can be manufactured from the same standard stock options available for support device manufacture), a virtual representation of plug stock specific for plugs (e.g., differing from the support stock in material type, material property, size, or otherwise differentiated), or from any other suitable virtual representation of physical plug stock. The identified plugs can optionally be shrunk by the threshold tolerance (e.g., by a threshold proportion, by a threshold distance, etc.).

In a third variation, the plugs can be concurrently generated with the virtual support device, wherein the plugs can be identified as portions of the virtual support stock that are disconnected from the remainder of the resultant virtual support device (e.g., disconnected from a virtual support device piece contiguous with a carrier portion). The identified plugs can optionally be shrunk by the threshold tolerance (e.g., by a threshold proportion, by a threshold distance, etc.). In a specific example, generating the plugs can include: subtracting the virtual part from a virtual part stock to form a virtual part negative; and identifying a set of internal negatives from the virtual part negative, wherein an internal negative includes a volume of virtual part negative separated from a remainder of the virtual part negative along more than a threshold proportion of a perimeter of the internal negative. However, the plugs can be otherwise generated.

Generating the plugs can optionally include aggregating multiple plugs with a raft to form an aggregate plug. This functions to ease manufacturing assembly by reducing multiple void plugging steps (e.g., to plug each void) to a single void plugging step to concurrently plug the voids associated with the respective plugs. This can be used when the number of plugs or voids exceeds a threshold number, exceeds a threshold density (e.g., to increase part stiffness during manufacture), or when any other suitable condition is satisfied. The plugs are preferably attached to the raft along a common plane, but can alternatively be attached to one or more rafts. The common plane can be the retention side, a plane parallel the retention side, be the opposing side, a plane cooperatively defined by the plug ends proximal the retention side, or be any other suitable plane.

In a first variation, aggregating multiple plugs with a raft to form an aggregate plug includes: identifying multiple virtual plugs for aggregation; and generating a virtual raft across the common plane shared by the plugs. The virtual plugs identified for aggregation can include: virtual plugs on opposing sides of the virtual device, plugs below a threshold size (e.g., below a threshold diameter, etc.), plugs above a threshold size, adjacent plugs separated by a distance below a threshold distance, plugs cooperatively forming more than a predetermined proportion of the total part volume, plugs positioned and/or configured to increase part strength during manufacture (e.g., to reduce part stress or deformation, as probabilistically deterministically, or otherwise determined, such as using FEA stress analysis), plugs selected to optimize one or more manufacturing parameters, or any other suitable set of plugs. Generating the virtual raft can include: arranging the identified plugs in the respective locations (e.g., in locations corresponding to the respective part voids), overlaying a virtual connective piece over the virtual plugs (e.g., a planar piece, rectilinear piece, a piece having material stock cross-section, etc.), and merging the virtual plugs to the connective piece to form a unitary piece. In one example, this can result in both an aggregate plug and one or more individual plugs, wherein the aggregate plug includes virtual plugs below a threshold diameter, and the individual plugs include the virtual plugs above a threshold diameter.

In a second variation, aggregating multiple plugs with a raft to form an aggregate plug includes: manufacturing physical analogs of each virtual plug, arranging each physical plug in the respective location relative to the other plugs, and attaching a raft to the physical plugs. The physical plugs can be arranged in the respective locations: automatically, based on the physical plug locations (e.g., using a pick-and place robot, wherein each plug's location is supplied to the robot); using the partially-manufactured part as a guide; or otherwise arranged. The raft can be attached to the physical plugs by adhering the plugs to the raft, welding the plugs to the raft, or otherwise attached to the raft. However, the aggregate plug can be otherwise generated.

Generating plugs for internal part voids can optionally include selecting internal part voids for plug generation. This can function to exclude voids that have a low probability of contributing to part deformation during clamping or part manufacture, which can lead to increased manufacturing speed (e.g., by reducing the assembly time) and/or reduced manufacturing cost (e.g., by reducing the amount of material used to manufacture the plug. In a first variation, all internal voids within the part can be selected for plug generation. In a second variation, internal voids having a major dimension larger than a threshold dimension can be selected for plug generation. The threshold dimension can be heuristically determined; deterministically determined; probabilistically determined; iteratively determined (e.g., based on past part failures and/or successes); set by a user or manufacturer; determined (e.g., selected, calculated, etc.) based on the material type (e.g., material properties; material strength; etc.), material thickness (e.g., in the x-y plane, thickness to the nearest external wall, etc.), or otherwise determined. In a third variation, internal voids having a void ratio satisfying a predetermined condition (e.g., exceeding a threshold ratio value, falling below a threshold ratio value) can be selected for plug generation. The void ratio can be determined based on the void volume, the void dimensions (e.g., major dimension, minor dimension, etc.), the part volume surrounding the void, the material thickness between the void wall and the nearest external wall, the material thickness between the void wall and the nearest external wall relative to a clamping vector (e.g., along the clamping vector, perpendicular the clamping vector, etc.), the anticipated clamping force, or based on any other suitable parameter. In one example, the void ratio can be the ratio of the void volume to the solid part volume (e.g., non-void volume). In a second example, the void ratio can be the ratio of the void dimension along the clamping vector relative to the total thickness of the non-void material along the clamping vector. However, the ratio can be otherwise calculated. However, any other suitable set of internal voids can be selected for plug generation.

5. Determining Assembled Unit Parameters.

The method can additionally include determining assembled unit parameters based on the virtual support device, which functions to give an indication of how well the part will fare during manufacture (e.g., whether part manufacture will fail, whether the part will be flung during the manufacturing process, whether the part will be deformed during manufacture, etc.). This can optionally function to evaluate how well the support device will prevent the physical part from translating or rotating. The assembled unit (fixtured unit) can be a virtual assembly of the virtual part retained within the virtual support device, a virtual assembly of the virtual part precursor (e.g., with the retention side machined but the opposing side unmachined) retained within the virtual support device, or be any other suitable model. The assembled unit parameters can be determined for every virtual part—potential support device combination, or for any other suitable subset of the combinations.

All or some of the variants discussed below can be performed serially, in parallel, or in any other suitable order. For example, translation validation (e.g., verifying whether the part will move when retained by the support device) can be performed prior to deformation verification using physical part stiffness.

Determining assembled unit parameters based on the virtual support device can include determining a stiffness of a physical part corresponding to the virtual part. This can function to indicate the amount of part deformation during manufacture while being retained by the support device. This can also function to indicate the amount and location of stresses introduced into the part manufacture while being retained by the support device. The stiffness (and/or stiffness measure) can be used to: include or exclude potential support devices from consideration, include or exclude potential support device—retention rotation—retention orientation combinations from consideration, identify part regions that need to be supported by a plug or auxiliary support, or be otherwise used.

In a first variation, determining the part stiffness can include determining a ratio of the part void volume relative to the part solid volume (e.g., determining a proportion of internal voids within the virtual part). The part voids that are considered can be those manufactured in the retention side, those manufactured prior to opposing side manufacture (e.g., machining), all the part voids, or any other suitable set of voids. This variation can include determining a total void volume based on a set of internal negatives (e.g., determined from the virtual support device generation process); determining a total solid volume based on a volume of the virtual part; and calculating a part stiffness as a ratio between the total void volume and the total solid volume. In a second variation, determining the part stiffness can include determining a ratio of the part void dimensions along a clamping axis (e.g., extending between the first and second pieces) relative to the part solid dimensions along the clamping axis. In a third variation, determining the part stiffness can include virtually modeling the part precursor retained within the support device, simulating a clamping force, and calculating the part stress. However, the part stiffness can be determined based on the retention force (e.g., wherein the force magnitude can be one of a standard set of potential retention forces), or otherwise determined.

Determining assembled unit parameters based on the virtual support device can include determining a total contact surface area between the virtual part and the potential virtual support device. This can function to determine whether there is sufficient contact area between the support device and the virtual part. This can additionally function to determine whether the retention force being applied by the support device to the virtual part is adequately distributed or concentrated in a single region, which can lead to surface imperfections such as dents or scratches. In one variation, determining a contact surface area can include determining the surfaces of the virtual part virtually contacting or proximal the potential virtual support device when the virtual part is virtually fixed with the potential virtual fixture. The virtual part surface can be deemed to be contacting the virtual support device when the external normal vectors of adjacent part and support device surfaces are substantially parallel (e.g., differing below a threshold angular difference, within several degrees of parallel, the angle between the normal vectors of the two surfaces is less than threshold angle, etc.), and directed toward the other surface. In a second variation, the virtual part surfaces be deemed to be contacting the virtual support device can be those virtual part surfaces that are encompassed by a piece of the virtual support device (e.g., within the boundaries of the virtual support stock from which the virtual support device was formed). However, the contact surfaces can be otherwise determined. The total contact surface area can be determined by summing all the determined contact surface areas, by summing the determined contact surface areas for a piece of the support device, or otherwise determined.

Figure 10:
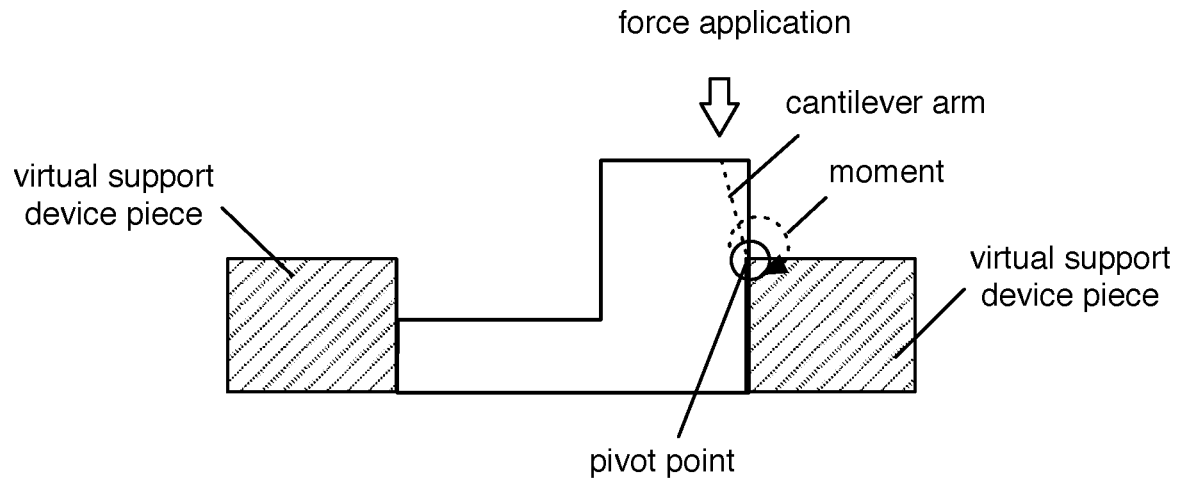
FIGS. 10 and 11 are schematic representations of a first and second variation of moment determination, respectively.
Figure 11:
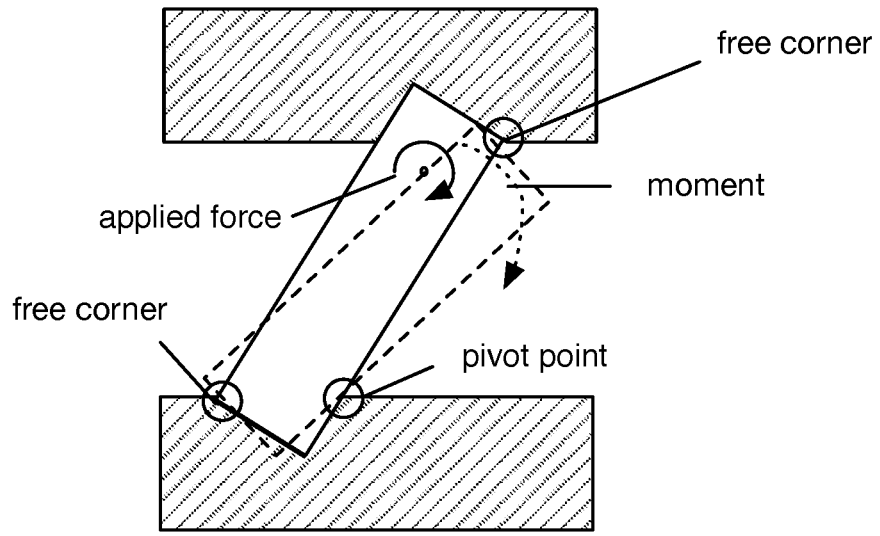

Determining assembled unit parameters based on the virtual support device can include determining the moment of the virtual part fixed within the virtual fixture. This can function to address the issue of part rotation during part manufacture, wherein parts can rotate (e.g., within the retention plane, rotate out of the retention plane, etc.) during part manufacture due to manufacturing force application. Examples of manufacturing forces include linear forces (e.g., normal to the opposing side; example shown in FIG. 10), rotational forces (e.g., due to tool rotation; example shown in FIG. 11), lateral forces (e.g., along the opposing side), or any other suitable manufacturing force. Determining the moment can function to give an indication of whether and/or how much the part will torque during part manufacture. This can further function to accommodate for or exclude part orientations that result in large part rotations due to application of manufacturing forces.

In a first variation, determining the moment of the virtual part includes virtually modeling the part precursor retained within the support device, simulating a machining procedure on the opposing side (e.g., automatically determined based on the features extending from the opposing side), and calculating the resultant part rotations.

In a second variation, determining the rotational inertia of the virtual part includes identifying a pivot point on the virtual part (e.g., a single point or a set of points), and calculating an applied rotational moment based on the pivot point, force application point, and a machining force. Identified pivot points can be: a part portion constrained by an edge of a piece of the support device (e.g., an edge of the retention features), wherein the part portion is unconstrained or exposed to one side of the pivot point; an edge of the opposing side contacting (e.g., retained by) the support device; the outer edges of the part contacting the support device; or any other suitable part portion. In one embodiment, all potential pivot points can be identified and analyzed. In a second embodiment, a subset of pivot points are identified and analyzed. The subset can include pivot points satisfying a predetermined condition or be any other suitable pivot point. Examples of the pivot points in the subset include: the most elevated pivot points, pivot points opposing unconstrained edges along the face to be machined, or any other suitable pivot point.

In one example, the pivot point can be defined along the interface between the furthest retention edge of the support device piece and a part side perpendicular the retention side, wherein the part could rotate within a plane perpendicular the machining direction or parallel the retention side. In a second example, the pivot point can be defined along the uppermost edge of the opposing side (e.g., face to be manufactured) contacting the support device, wherein the part could rotate out of the plane perpendicular the machining direction. However, the pivot point can be otherwise identified.

Calculating a moment based on the pivot point and a machining force functions to determine the amount of rotary force that will be applied to the part during manufacture. The machining force can be a linear force (e.g., along a normal vector to the machining face, along the manufacturing axis, perpendicular the retention plane, etc.), a rotational force (e.g., about the normal vector to the machining face, within the retention plane, etc.), a feeding force (e.g., along the machining face), or be any other suitable force. One or more machining forces can be considered. Machining forces that can be considered include: anticipated machining forces (e.g., determined based on the anticipated toolpath, tools, and/or machine), standard machining forces (e.g., representative forces), or any other suitable set of machining forces. Calculating the moment can include calculating the moment based on the machining force and a cantilever arm defined between a force application point and the pivot point. The force application point can be: the anticipated force application point, determined based on the anticipated toolpath; one of a set of potential force application points, the set including every incremental potential force application point along the machining face (e.g., opposing side, face to be machined), separated from adjacent potential points by a predetermined distance (e.g., 1 mm); or be any other suitable force application point. When multiple potential force application points are available, a moment can be calculated for each potential force application point. Alternatively, the moment can be calculated for a single force application point, or for any suitable subset of the multiple force application points. In one example, calculating the moment includes, for each part-virtual support device combination, calculating a moment for each machining force—force application point combination. However, the moment can be otherwise calculated.

Determining assembled unit parameters based on the virtual support device can include determining whether the part will escape the support device, which can function to determine whether part manufacturing will fail due to part flinging. The part can be determined to escape the support device in response to the applied force exceeding the reaction force (e.g., exceeding the retention force along a vector opposing the applied force) and/or the applied moment exceeding the reaction moment. The reaction force and reaction moment are preferably determined for the interface between the part and an adjacent support device piece (e.g., a part surface, a part corner), but can alternatively be determined for any other suitable part position. The reaction force can be determined based on the interface friction, which can be determined (e.g., calculated, estimated) based on: the part material, the support device material, the clamping force, the engaged part features, surface features, or any other suitable parameter. The friction can be the friction along the interface (e.g., opposing the force application point, adjacent the force application point, etc.), but can be along any other suitable part surface. The reaction moment can be determined based on the part's moment of inertia (e.g., relative to an opposing retained part portion), the reaction force, or any other suitable parameter. Alternatively, the part can be determined to escape the support device when a first and second opposing corner are classified as free corners, and a machining force is applied that results in a moment with a tangent directed along an external normal vector to the free corner. A free corner can be a corner defined by an edge that is not retained by the support device, or be otherwise defined.

Determining assembled unit parameters based on the virtual support device can include ensuring that the part will clear the support device S320. This can function to accommodate for tool wear, which can result in larger parts and/or smaller support device lumens. This tolerance variation can cause the part to be larger than the support device lumen, which can result in support device interference with the part and part defects (e.g., visual defects, such as nicks or scratches, part deformation, etc.) or part deflection.

Ensuring that the part will clear the support device S320 can optionally include: identifying the contact surfaces on the part features extending along the retention direction, given the selected retention rotation; identifying the normal vectors to all contact surfaces (e.g., where the support device would contact the part), wherein the normal vectors are internal normal vectors substantially mirroring the force vectors applied by a simulated support device to the surface; shifting the part along each identified normal vector (e.g., a predetermined distance, applying a predetermined amount of shifting force, a small predetermined distance accounting for tool wear, etc.); determining the amount of interference between the virtual part model and the virtual support device after the shift; and selecting the part side pair resulting in the least amount of interference. The part clearance can be iteratively determined, calculated, or otherwise determined. However, part clearance of the support device can be otherwise determined.

Identifying the normal vectors to all contact surfaces can include: identifying the contact surfaces and determining the normal vectors to the contact surfaces. Identifying the contact surfaces can include: generating a virtual support device that includes a first and second geometry that complements the first and second sides of the virtual part side pair, respectively; virtually arranging the virtual part model within the virtual support device, based on the complimentary geometry; and identifying the points of contact between the virtual support device and virtual part. However, the contact surfaces can be otherwise determined. The normal vector identification and part shift is preferably performed on an individual clamp basis (e.g., for each support device piece, with the other support device pieces decoupled from the part), but can alternatively be performed for the assembled support device (e.g., with all support devices coupled to the part), or for any suitable set of support device pieces.

Figure 9:
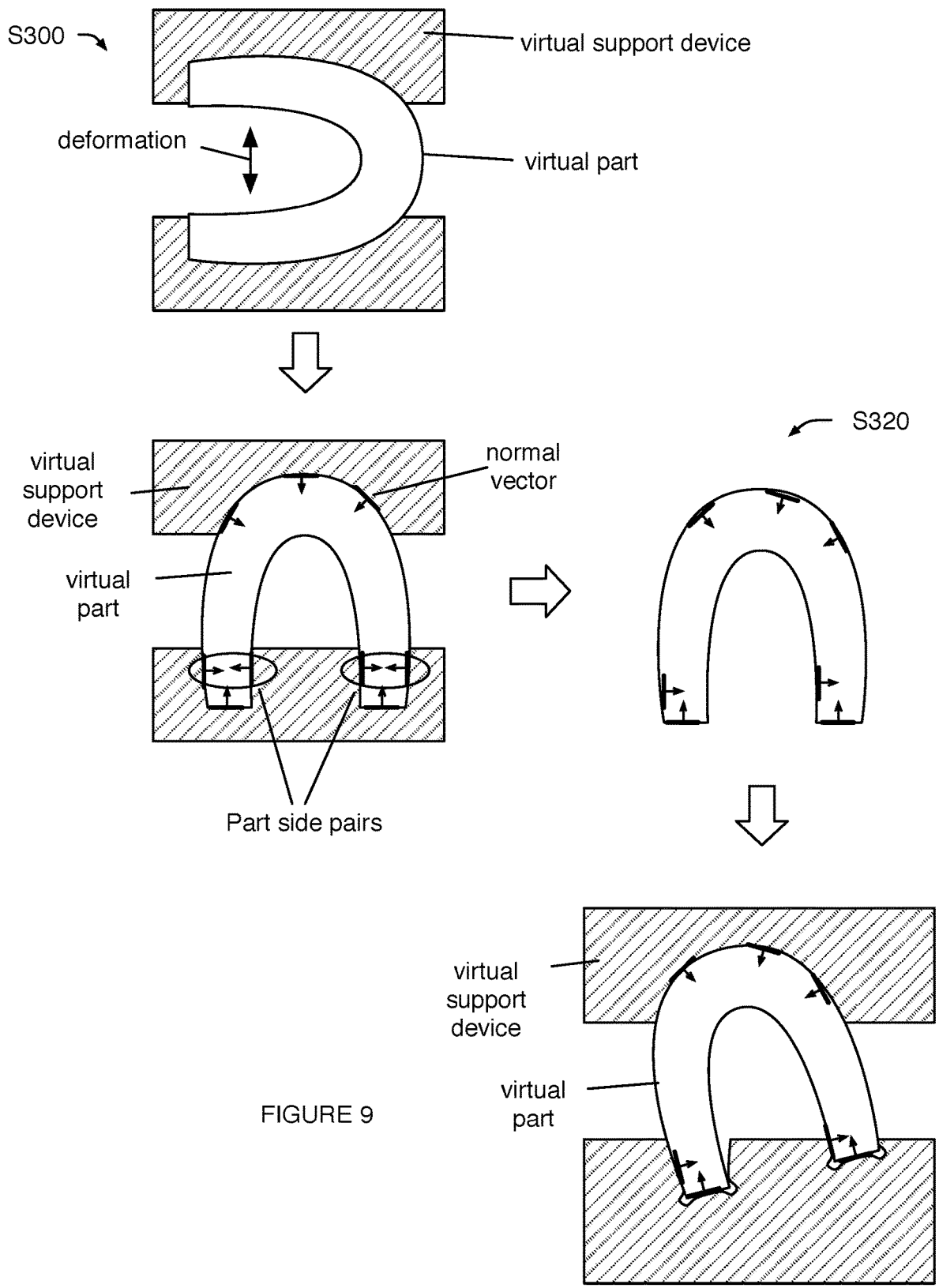
FIG. 9 is a schematic representation of an example of determining the retention rotation for a custom part and part clearance.

Ensuring the part clears the support device S320 can optionally include: identifying parallel, opposing sides on a continuous contact surface (e.g., part side pairs, contact surface pairs). This can function to reduce the likelihood of generating a support device that overconstrains the part by clamping the parts along the parallel sides, and can additionally function to avoid part binding and deformation. The parallel opposing sides (e.g., part side pair) can be determined based on the respective normal vectors, wherein a parallel opposing side will have substantially parallel, opposing normal vectors. The part side pairs are preferably pairs of opposing part sides (e.g., virtual part sides) having opposing interior normal vectors, but can alternatively be adjacent part sides, part sides within a predetermined angular range of each other (e.g., wherein the first side is more than 90° away from the second side), or be any other suitable pair of part sides. Examples of part side pairs are shown in FIG. 7 and FIG. 9. Additionally or alternatively, a set of sides including one, three, or any suitable number of sides can be selected in lieu of a side pair. The generated virtual support device preferably does not concurrently contact the entirety of both sides within a side pair (e.g., the virtual fixture can contact a portion of a first side and all of a second side, all of the first side and none of the second side, etc.), but can alternatively be otherwise related to the part side pairs.

In response to identification of part side pairs, the method can include, removing one or more of the parallel opposing sides as a contact surface; removing the virtual support devices with part side pairs from consideration; using the parameters of the part side pairs in support device score calculation (e.g., number of pairs, part side pair proportion of the total contact surface, etc.); or performing any other suitable process on the virtual support device.

Determining assembled unit parameters based on the virtual support device can include identifying potential cantilever arms in the assembled unit. Identifying a potential cantilever arm can include: identifying a free part corner in the assembled unit, identifying potential force application points along the machining face (e.g., identifying exposed points along the machining face), and calculating the potential cantilever arm between the free part corner and the force application point.

6. Characterizing the Virtual Support Device.

The method can optionally include characterizing the virtual support device S500, as shown in FIG. 1. Characterizing the virtual support device can include scoring the virtual support device, calculating a failure probability, or otherwise characterized.

In one variation, characterizing the virtual support device S500 includes determining a work holding confidence score for the virtual support device, which functions to characterize the reliability (e.g., retention stability) of the virtual support device. A work holding confidence score is preferably determined for each potential virtual support device being considered, but can alternatively be calculated for potential virtual support devices satisfying a predetermined set of parameters (e.g., potential virtual support devices including cantilever arms), or be determined for any suitable virtual support device. The work holding confidence score can be determined for each candidate virtual support device, as shown in FIG. 2, for the selected manufacturing virtual support device, or for any other suitable virtual support device. The work holding confidence score is preferably determined based on the part stiffness, the total contact surface area, and the moment, but can alternatively be determined based on the number of cantilever arms, the length of the cantilever arms, the number of contact surface pairs, the surface area of contact surface pairs, based on any other suitable assembled unit parameter, manufacturing time, manufacturing cost, material type, opportunity cost (e.g., cost to manufacturing the fixture instead of another part), failure risk, manufacturing machine, manufacturing tools and parameters thereof (e.g., sharpness, etc.), or any other suitable parameters. The work holding confidence score can be an absolute score, a classification, a range, or be any other suitable data structure. The work holding confidence score can be calculated, heuristically determined, probabilistically determined, classified, determined using a neural network, determined using a genetic algorithm, or otherwise determined based on the assembled unit parameter values. The work holding confidence score determination methods can be static, dynamically updated (e.g., trained based on the quality control results of prior support devices, parts, and work holding confidence scores), or otherwise adjusted.

7. Determining a Virtual Support Device for Use in Part Manufacture.

The method can optionally include determining a virtual support device as the manufacturing virtual support device (e.g., virtual support device for use in part manufacture) S600. This can be useful when multiple potential virtual support devices are generated for the same part, and functions to select the best (e.g. optimal, highest scoring, easiest to manufacture, etc.) virtual support device for use in manufacture. The manufacturing virtual support device can be associated with a retention side, a retention rotation, a seating position, and/or any other suitable part position parameter used to construct the virtual support device. Determining a manufacturing virtual support device can include selecting the virtual support device based on the respective characterization (example shown in FIG. 2), randomly selecting the virtual support device, clearing the virtual support device for use in manufacture, or otherwise determining the manufacturing virtual support device.

Figure 13:
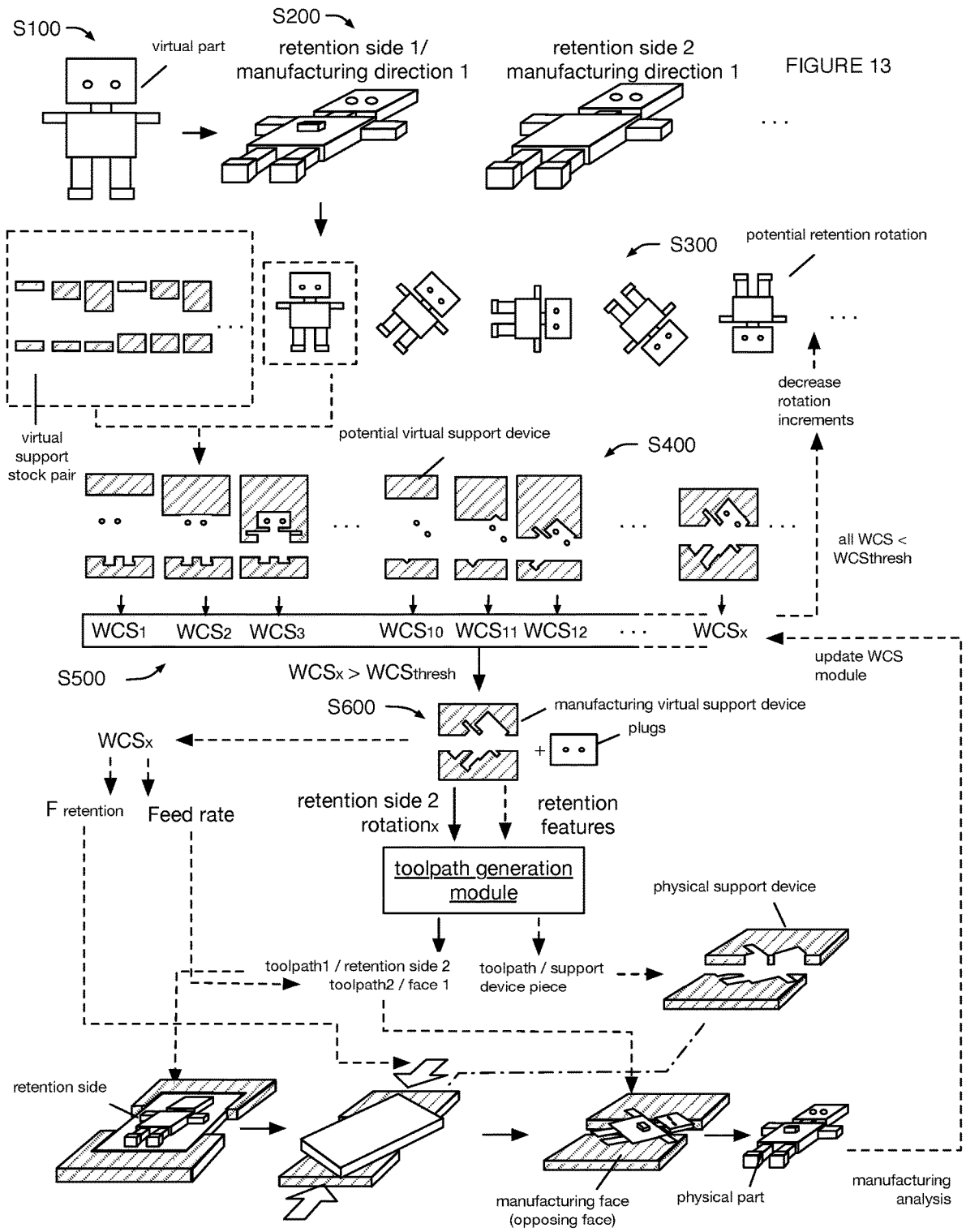
FIG. 13 is a schematic example of a specific example of the method.

In a first variation, the manufacturing virtual support device is selected from a plurality of potential virtual support devices based on the respective work holding confidence score, example shown in FIG. 13. A virtual support device having the highest work holding confidence score above a threshold value is preferably selected as the manufacturing virtual support device, but any other suitable virtual support device can be selected. In one example, the potential virtual support device having the highest work holding confidence score can be selected as the manufacturing support device. In a second example, the potential virtual support device having a work holding confidence score above a threshold score (e.g., predetermined, set by a manufacturing facility entity, received from a user, etc.) can be selected as the manufacturing virtual support device. In a third example, potential virtual support devices can be iteratively generated (e.g., with different potential rotations, different support stock options, etc.) until one or more of the potential support devices have a work holding confidence score above a threshold score, wherein the potential virtual support device with the highest work holding confidence score can be selected as the manufacturing virtual support device.

In a second variation, the virtual support device can be selected to optimize manufacturing parameters (e.g., minimize manufacturing time, minimize cost, etc.), selected to maximize one or more manufacturing parameters, determined using a trained system (e.g., a convolutional neural network, genetic algorithm, etc.), using a combination of the above measures (e.g., a weighted sum of the support device manufacturability score and work holding confidence score), or otherwise selected. In one example, a sub-optimal virtual support device can be selected over a more optimal virtual support device when the sub-optimal virtual support device has manufacturing parameters closer to those of a secondary virtual part, such that an overall manufacturing parameter (e.g., manufacturing time) is optimized. However, the virtual support device can be otherwise selected.

The method can optionally include clearing a virtual support device for use in part manufacture as a manufacturing virtual support device. This can function to prevent subpar support devices from being used in part manufacture, wherein subpar support device use can result in part failures, manufacturing failures (e.g., part flinging, tool interferences, etc.), or other failures.

The cleared manufacturing virtual support device can subsequently be manufactured (e.g., wherein the method includes manufacturing a physical support device corresponding to the manufacturing support device) and used to retain the part precursor (e.g., partially manufactured part) during subsequent part manufacture. The manufacturing support device can also be re-used for manufacture of subsequent part instances. However, cleared manufacturing virtual support devices can be otherwise used. In response to virtual support device rejection, the method can include iterating though the method with different considerations (e.g., different virtual support stock options, different rotation increments, different retention direction options, etc.) until a virtual support device that clears the analysis is generated. Alternatively, the rejected virtual support device can be adjusted until the virtual support device clears the analysis. However, rejected virtual support devices can be otherwise treated.

The virtual support device can be cleared for use as the manufacturing virtual support device when the virtual support device satisfies a set of clearance requirements. The clearance requirements can include a score above a threshold score, a support device stiffness above a threshold stiffness, passing a virtual simulation of the manufacturing process using the support device (e.g., generating less than a threshold number of errors of a given type, etc.), or be any other suitable condition. The score can be a work holding confidence score (discussed below), a manufacturability score (e.g., based on the manufacturing time, available machines, available tools, etc.), or be a score indicative of any other suitable parameter. The threshold score can be iteratively determined (e.g., increased when manufacturing analysis indicates that cleared support devices are insufficient in physical manufacture), set by a manufacturer, or otherwise determined.

In one embodiment, the method includes determining whether to repeat the virtual support device generation process based on the work holding confidence score. For example, the method can be repeated (reiterated) with a different set of considerations (e.g., finer rotation intervals, different rotation intervals, different orientation angles, different support stock options, etc.) until one or more virtual support devices with work holding confidence scores beyond a threshold score are generated. The threshold score can be predetermined, determined by the user account supplying the virtual part, determined by the manufacturing facility, or otherwise determined.

8. Determining Manufacturing Parameters Based on Virtual Support Device Characterization.

The method can optionally include determining manufacturing parameters based on the work holding confidence score, wherein the manufacturing parameters are used during part manufacture (example shown in FIG. 13). However, the manufacturing parameters can be determined based on any other suitable variable. The manufacturing parameters can be determined before virtual support device selection, after virtual support device selection, after toolpath generation, after toolpath validation, or at any other suitable time.

In one variation, determining manufacturing parameters can include determining cutting parameters based on the work holding confidence score, which functions to determine the cutting parameters used to manufacture the manufacturing face of the part (e.g., based on the force a workpiece can withstand while retained during manufacturing). Cutting parameters that can be determined include: cutting speed, feed rate, or any other suitable parameter. The cutting parameter value (e.g., feed rate, cutting speed) preferably varies proportionally with the work holding confidence score (e.g., wherein a slower material feed speed is used when the support device's work holding confidence score is low), but can alternatively vary inversely with the work holding confidence score or vary in any other suitable manner. The material feed speed can be calculated, selected, estimated, determined based on historic part manufacture (e.g., based on historic feed rates and associated work holding confidence scores), determined based on a supervised training set (e.g., historic part manufacture), or otherwise determined based on the work holding confidence score, the material type, or any other suitable parameter. The material feed speed can be determined for the entire manufacturing face, for portions of the manufacturing face, or for any suitable part portion. For example, the method can identify high-risk regions (e.g., force application points on the manufacturing face resulting in a high moment or probability of part failure) and slow down the feed rates for those regions.

In a second variation, determining manufacturing parameters can include determining a step down (e.g., material removal depth) based on the work holding confidence score. For example, a shallower step down per pass can be selected for an assembled unit (e.g., support device) with a low work holding confidence score (e.g., due to a high resultant moment due to downward force application).

In a third variation, determining manufacturing parameters can include determining a retention force based on the work holding confidence score, which functions to determine the clamping force used during part manufacture. However, the retention force can be determined based on the part stiffness, part stress, or based on any other suitable parameter.

In one embodiment, the retention force varies with the work holding confidence score (e.g., up to a maximum retention force), wherein a high work holding confidence score indicates low part deformability. This can function to more securely retain the part during part manufacture, particularly if a high feed rate is used (e.g., due to the high work holding confidence score).

In a second embodiment, the retention force varies inversely with the work holding confidence score (e.g., down to a minimum retention force), wherein a high work holding confidence score indicates a relatively secure retention geometry. In this embodiment, the retention force can be minimized to prevent part surface marring. However, the retention force can otherwise vary based on the work holding confidence score The retention force can be calculated, selected, heuristically determined, probabilistically determined, or otherwise determined. Alternatively, the retention force can be optimized, iteratively selected, selected to minimize rotational inertia and surface marring, or be otherwise determined.

However, the method can include determining the tool speed (e.g., the tool speed can increase with increased work holding confidence score), machining type, tool type, specific tool, support devices or parts to be manufactured in the same manufacturing volume, on the same plate, or using the same toolpath as the physical analog of the virtual part (e.g., wherein those parts can have similar scores to the instantaneous assembled unit), coolant parameters, stepdown, or any other suitable manufacturing parameter based on the work holding confidence score in any other suitable manner.

10. Physical Support Device and Part Manufacture.

The method can additionally include manufacturing a physical support device based on the manufacturing virtual support device, which functions to create a real support device to support and locate the real part. The real physical support device is preferably manufactured in substantially the same manner as real part manufacture, but can alternatively be otherwise manufactured. In one variation, this includes generating manufacturing instructions based on the virtual support device and controlling a machine to manufacture a physical support device based on the manufacturing instructions. The manufacturing instructions can include: support device toolpaths or fixture toolpaths (e.g., generated based on the virtual support device and/or retention features, using the same or different method as part toolpath generation), fixturing instructions (e.g., assembly instructions), or any other suitable set of instructions. In one example, toolpaths can be generated to manufacture the virtual support device geometry, wherein the toolpaths can be converted (automatically or manually) into G-code. The real support device can be manufactured (e.g., milled, drilled, turned, etc.) out of a piece of support device stock using the G-code. The support device stock can be standardized, custom, or have any other suitable dimension, material, or parameter. The support device features for all support device pieces are preferably manufactured in a singular piece, then split apart after feature manufacture. However, the features can be manufactured after the pieces are split apart, or be manufactured in any other suitable order. In a second example, the real support device can be formed through additive manufacturing (e.g., 3D printing). In a third example, the real support device can be cast or molded. However, the real support device can be formed using any other suitable manufacturing technique.

The custom support device can be manufactured in the same run (e.g., concurrently manufactured in the same machining volume, on the same fixture plate, using the same master toolpath, etc.) as other physical custom parts, be manufactured in a separate run, or manufactured with any other suitable component. For example, the physical support device and a secondary custom part can be manufactured using the same instance of a master toolpath, wherein the master toolpath includes the toolpath for the secondary custom part and the toolpath for the physical support device. In a specific example, the method can optionally include selecting a combination of virtual parts and virtual support devices for concurrent manufacture. The combination can be selected based on time, material cost, failure rate, packing density, shared tools, shared machines, common or similar manufacturing parameters (feed rate, retention force, etc.), or based on any other suitable factor.

The method can additionally include manufacturing a physical analog of the virtual part using the virtual support device (e.g., manufacturing virtual support device), which functions to create a physical part corresponding to the virtual part. Manufacturing the physical part can include: generating part machining instructions and manufacturing the part according to the manufacturing instructions. In one example, manufacturing the physical part can include generating manufacturing instructions for the retention side and the opposing side (e.g., opposing face); manufacturing the retention side; and manufacturing the opposing side while the retention side is retained within the physical support device.

The part machining instructions can include toolpaths, fixturing instructions, or any other suitable instruction. In one variation, generating part machining instructions includes generating a toolpath for each virtual part face based on the features extending from the respective face. The toolpath can be generated by a toolpath generation module or by any other suitable module. In one example, this includes: sending an identifier for the retention side and an identifier for the retention rotation (associated with the manufacturing virtual support device) to the toolpath generation module, generating a first toolpath for the retention side with the toolpath generation module, and generating a second toolpath for the opposing side (opposing the retention side) with the toolpath generation module. The toolpaths are preferably generated based on the retention rotation, but can additionally or alternatively consider any other suitable factor. However, any suitable toolpath can be generated for any suitable surface or set of features using any other suitable module. The machining instructions can additionally include machining parameters determined based on the assembly unit parameters. For example, the toolpath feed rate can be dictated by the feed rate determined based on the work holding confidence score, wherein the determined feed rate is provided to the toolpath generation module. However, the manufacturing instructions can be otherwise determined.

Manufacturing the part according to the machining instructions can include controlling manufacture of the physical part using the instructions (e.g., using the toolpath, the fixturing instructions, etc.). Controlling manufacture can include: sending the instructions to a machine, wherein the machine operates according to the instructions; sending successive instructions to the machine, wherein the control system verifies prior instruction performance based on signals received from the machine before sending the next instruction; or otherwise controlling the machine according to the instructions.

The method can optionally include validating the part toolpath, which functions to identify adverse interactions between the part, the support device, and the machine. Validating the part toolpath can include: generating the virtual assembled unit and identifying collisions between the toolpath and the virtual support device. This can function to virtually check for tool accessibility, which functions to ensure that the subsequently created real support device will not interfere with the tool during part manufacture. However, the part toolpath can be otherwise validated.

Virtually checking for tool accessibility can be particularly desirable in multi-axis machining processes that enable features at an angle to the x-, y-, and z-axes to be manufactured (e.g., 5-axis machining processes). Tool accessibility is preferably determined after support device selection (e.g., based on the work holding confidence score), but can alternatively be determined after support device depth determination, be determined before or during support device depth determination, before, during, or after orientation determination, after virtual support device construction, or at any other suitable time. Tool accessibility can be determined based on the toolpaths for the part, wherein the tool paths can be predetermined based on the features for the part. Determining tool accessibility can include building a complete or partial virtual model of the assembled unit and virtually simulating toolpath traversal over the manufacturing face. Alternatively, determining tool accessibility can include identifying problematic regions (e.g., through pattern matching, neural networks, etc.), and testing the toolpath for the problematic regions. Alternatively, determining tool accessibility can include creating a map of the volume traversed by the tool, overlaying the assembled unit with the map, and identifying collisions as tool-virtual support device overlaps. However, tool accessibility can be otherwise determined.

In one variation, a potential virtual support device can be rejected if the support device will interfere with a toolpath for the exposed part orientation.

In a second variation, the support device can be modified to accommodate the toolpath. In this variation, the toolpath validation can include identifying the collision regions, wherein only parameters of the identified collision regions of the virtual support device are modified to form an adjusted virtual support device. Parameters that can be adjusted include adding features (e.g., adding a tool aperture, adding a tool channel around the collision region), removing features, adjusting the support device height (e.g., shortening the support device), or include any other suitable support device parameter. The amount of adjustment can be dependent on: the anticipated tool type to be used (e.g., specified by the toolpath), the parameters of the specific tool to be used (e.g., amount of estimated wear, etc.), the amount of interference, or based on any other suitable factor. In one example, the method can include providing the collision locations to a support device adjustment module or the support device generation module, wherein the module creates the adjusted virtual support device. Toolpath validation and virtual support device adjustment can be performed once, be repeated until the assembled unit includes less than a threshold number of collisions, or be performed any number of times.

In a third variation (e.g., the variation where tool accessibility is determined after support device selection), the method can be reiterated using a different set of considerations if the support device will interfere with the toolpath, to generate new potential virtual support devices for consideration. However, the support device geometry can be otherwise adjusted or determined based on the tool accessibility.

The method can optionally include performing a manufacturing analysis, which can function to characterize the physical part manufacture. The manufacturing analysis can be performed during or after part manufacture. The manufacturing analysis can analyze and/or output: part stresses, part deformation, surface marring, tool interactions, part accuracy (e.g., to the virtual part), feature tolerances, manufacturing failures (e.g., whether the part was flung, how many times the machine had to be stopped, etc.), or any other suitable factor. However, any other suitable parameter can be considered. The manufacturing analyses can be performed based on: computer vision (e.g., from an optical system), machine sensors (e.g., force sensors, acoustic sensors, etc.), post-machining analysis machine sensors (e.g., QC sensors), or using any other suitable sensing system. The manufacturing analysis can be performed using: heuristics, pattern matching, classification, regression, or any other suitable method. However, the manufacturing analysis can be otherwise performed.

The method can optionally include adjusting the modules based on the manufacturing analysis, which can function to refine the modules (e.g., learn) based on the results of physical part manufacture. Modules that can be updated include: the virtual support device generation module, the virtual support device characterization module(s) (e.g., work holding confidence score generator, stress analysis module, etc.), the toolpath generation module, the toolpath validation module, or any other suitable module. The modules can be updated based on: virtual support device parameters and actual manufacturing parameters. The virtual support device parameters can include: the virtual support device, the virtual part, the selected part orientation (e.g., position, face, rotation, etc.), the assembly unit parameters, the work holding confidence score, other scores associated with the virtual support device, or other parameters. The actual manufacturing parameters can include: actual tool speed, feed rate, quality control factors, or other parameters.

The modules can be updated with a calibration module, wherein the calibration module can be a supervised training algorithm, unsupervised training algorithm, or utilize any other suitable updating method. In one example, the work holding confidence score generator can be retrained when the work holding confidence score for the virtual support device (corresponding to the physical support device used in part manufacture) satisfied the score threshold requirements, but the physical part was flung out of the physical support device during part manufacture. The generator can be retrained to result in a lower work holding confidence score (e.g., lower than the threshold) given the same inputs. Alternatively, the generator can be trained to select a different threshold. However, the modules can be otherwise updated.

11. Specific Examples.

In a specific example, the method includes: receiving plurality of virtual parts (each received from a different user account); for each virtual part of the plurality: identifying a plurality of potential retention sides on the virtual part (e.g., wherein each potential retention side including a set of features extending from the potential retention side); for each potential retention side of the plurality of potential retention sides, generating a plurality of potential retention rotations in a plane parallel the potential retention side, and generating a plurality of potential virtual fixtures for each potential retention rotation of each potential retention side, wherein the potential virtual fixtures are generated based on the set of features extending from the respective potential retention side. The method can additionally include retrieving a plurality of virtual stock fixture pairs, each virtual stock fixture pair including a first virtual stock fixture opposing a second virtual stock fixture, wherein the plurality of virtual stock fixture pairs encompass every combination of standard stock fixture depth options for the first and second stock fixtures; and generating a potential virtual fixtures for every combination of each potential retention side, potential retention rotation, and virtual stock fixture pair. The method can additionally include calculating a workholding confidence score (WCS score) for each potential virtual fixture, and selecting a virtual fixture from the plurality of potential virtual fixtures based on the respective WCS score (e.g., wherein the selected fixture can be the one with the highest WCS score above a threshold score). The method can additionally include generating a toolpath based on the retention side and retention rotation associated with the selected virtual fixture, manufacturing a physical fixture corresponding to the virtual fixture, manufacturing the retention side of the physical part using the toolpath, retaining the retention side in the physical fixture, and machining the opposing side of the physical part using the toolpath. The method can additionally include determining manufacturing parameters, such as the retention force (clamping force) and the feed rate based on the WCS score, wherein the physical fixture can be tightened to the retention force to retain the retention side, and the opposing side can be manufactured at the feed rate.

In a second specific example, an optimal retention direction can be determined based on the virtual part (e.g., virtual part features), an optimal retention rotation can be determined based on the virtual part and the optimal retention direction, and a virtual support device can be constructed based on the optimal retention direction and rotation. The resultant virtual support device can be characterized, manufactured, and used in a similar manner to the first specific example above, but can be otherwise used.

Any of the above variations can use: case-based reasoning with displacement analysis, mechanical linkage analysis, optimized stiffness-displacement analysis, Procrustes-based pairwise optimization, blackboard framework, case-based reasoning, CDR augmented two dimensional geometric overlay, directed graph theory using tolerance analysis, displacement optimization, displacement optimization using genetic algorithms, displacement optimization using penalty-function methods, finite element analysis, finite element and nonlinear rigid body dynamics analysis, force analysis using particle swarm optimization, force and moment analysis, force and moment equilibrium analysis, genetic-algorithm based optimization using screw theory, genetic algorithms, genetic algorithm optimization, genetic algorithm optimization using finite element analysis, genetic algorithm-based optimized stiffness-displacement analysis, geometric and kinetic model analysis, geometric constraint based reasoning, geometric reasoning, geometry and graphical force analysis, geometry and rule-based approach, geometry-based reasoning, graph approach, graph theory using tolerance analysis, graph theory using tolerance factors, graph theory using tolerance normalization, group technology/neural network, heuristic preferences with screw-set theory, heuristic rule-base, heuristic rule-base approach with geometric reasoning, kinematic algorithm, kinematic variation analysis, multi-criteria optimization, multi-objective optimization using an interchange algorithm, neural network, non-optimized evolutionary algorithm, nonlinear optimization algorithm, object oriented reasoning with fuzzy set optimization, parametric modeling, precedence matrix with genetic algorithm, pseudo-gradient based optimization, qualitative rule-based analysis, rule induction and re-use, rule-based approach, rule-based approach augmented with fea, rule-based approach featuring graph analysis, rule-based approach, stability analysis, rule-based approach, tolerance sensitivity analysis, rule-based with displacement analysis, stiffness-displacement analysis, stress fracture analysis, swept volume analysis, tolerance analysis, or any other suitable technology.

Figure 3:
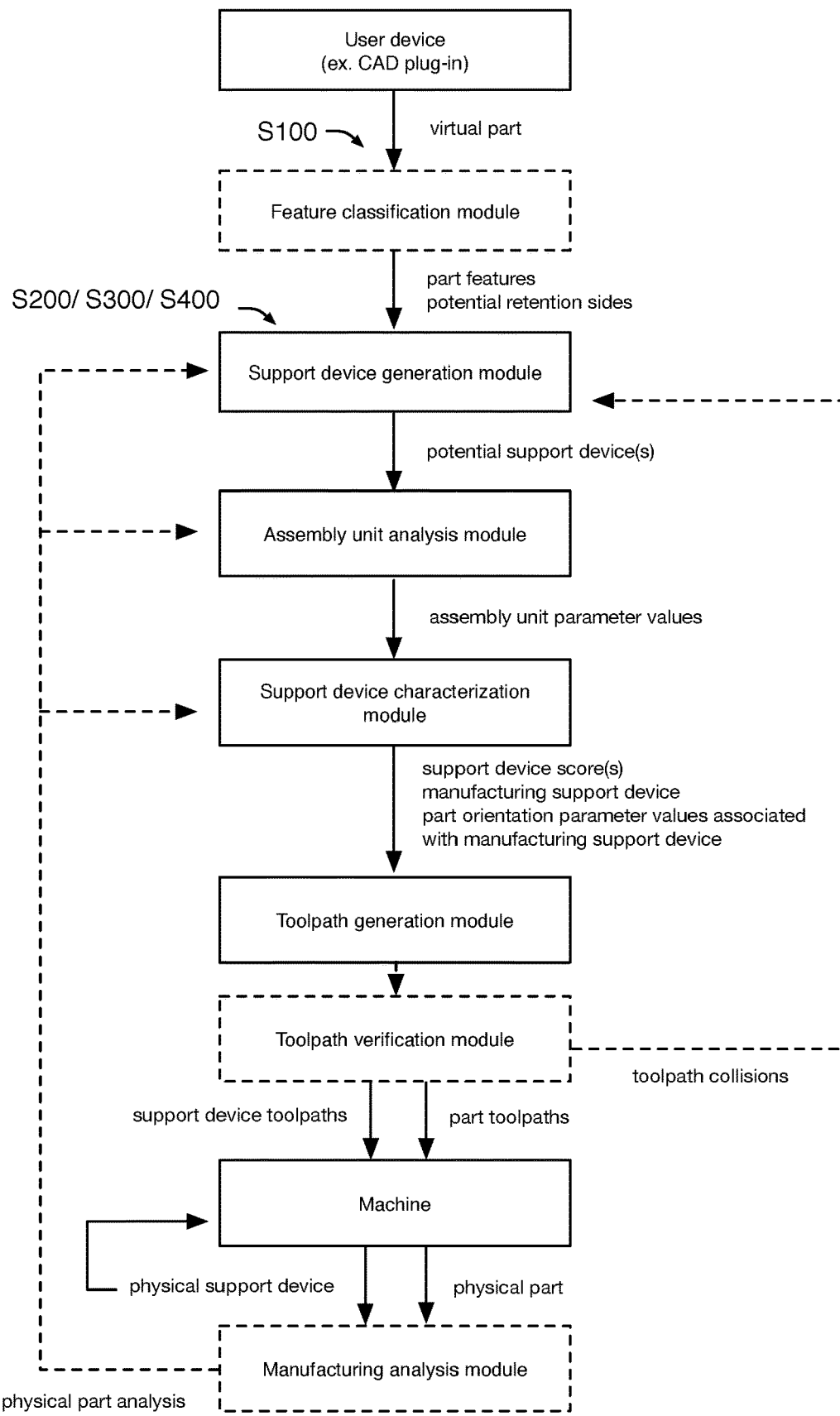
FIG. 3 is a schematic representation of a variation of the system.

An alternative embodiment preferably implements the above methods in a computer-readable medium storing computer-readable instructions. The instructions are preferably executed by computer-executable components preferably integrated with a support device generation system. The support device generation system can include a retention direction determination system, a retention rotation determination system, and a support device creation system that uses the outputs of the retention direction determination system and retention rotation determination system to generate a virtual fixture. The support device generation system can be used as part of a larger system, including a virtual part analysis module, an assembly unit analysis module, a support device characterization module, a toolpath generation module, a machine, and a manufacturing analysis module, example shown in FIG. 3. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Embodiments of the system and method can include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method for automated fixture generation, comprising:
   receiving a virtual part, the virtual part comprising a plurality of virtual features;
   determining a set of potential part orientations;
   for each potential part orientation of the set:
      determining a retention side of the virtual part based on the orientation;
      generating a virtual fixture based on the virtual features extending from the retention side; and
      determining a confidence score for the virtual fixture;
   selecting an orientation from the set of potential part orientations based on the confidence score for the corresponding virtual fixture; and
   generating machining instructions for manufacturing a physical analog of the virtual part based on the orientation.

2. The method of claim 1, further comprising:
   determining a set of potential part rotations for each potential part orientation, wherein virtual fixture generation and confidence score determination is performed for each combination of a potential part orientation and a potential part rotation; and
   selecting a rotation from the set of potential part rotations based on the confidence score for the virtual fixture corresponding to the combination of the orientation and the rotation.

3. The method of claim 2, wherein generating a virtual fixture comprises:
   determining a first and second clamping face based on the rotation, wherein the first clamping face opposes the second clamping face;
   determining retained virtual features extending from the retention side and arranged along the first and second clamping faces; and
   determining virtual fixture geometry based on the retained virtual features.

4. The method of claim 3, further comprising, prior to generating the virtual fixture, virtually enlarging the virtual features on the first and second clamping faces.

5. The method of claim 1, further comprising, prior to determining the confidence score: adding clearance to internal corners in the virtual fixture to generate a modified virtual feature, wherein the confidence score is determined based on the modified virtual feature.

6. The method of claim 1, wherein the method further comprises, for each potential part orientation of the set, determining a manufacturability score for the virtual fixture, wherein the orientation is further selected based on the manufacturability score for the corresponding virtual fixture.

7. The method of claim 1, wherein the confidence score is determined based on one or more of: kinematic analysis of the virtual fixture, finite element analysis, and heuristics.

8. The method of claim 1, wherein the confidence score is determined based on one or more of part stiffness and total contact area between the virtual part and the virtual fixture.

9. The method of claim 8, wherein part stiffness is determined based on a ratio of void volume to solid volume along a retention axis.

10. The method of claim 1, further comprising generating a virtual plug for a void in the virtual part.

11. The method of claim 10, wherein the virtual plug is generated for voids appearing in the retention side of the virtual part.

12. The method of claim 1, wherein the set of potential part orientations is determined by a user.

* * * * *